(12) United States Patent
Liesener et al.

(10) Patent No.: US 12,292,274 B2
(45) Date of Patent: May 6, 2025

(54) INTERFEROMETRIC LENS ALIGNER AND METHOD

(71) Applicant: Zygo Corporation, Middlefield, CT (US)

(72) Inventors: Jan Liesener, Middletown, CT (US); Paul A. Townley-Smith, Irvine, CA (US)

(73) Assignee: Zygo Corporation, Middlefield, CT (US)

( * ) Notice: Subject to any disclaimer, the term of this patent is extended or adjusted under 35 U.S.C. 154(b) by 11 days.

(21) Appl. No.: 17/869,846

(22) Filed: Jul. 21, 2022

(65) Prior Publication Data

US 2023/0031531 A1 Feb. 2, 2023

Related U.S. Application Data

(60) Provisional application No. 63/226,449, filed on Jul. 28, 2021.

(51) Int. Cl.
  *G01B 11/27* (2006.01)
  *G01B 11/24* (2006.01)
  *G02B 27/62* (2006.01)

(52) U.S. Cl.
  CPC ........ *G01B 11/272* (2013.01); *G01B 11/2441* (2013.01); *G02B 27/62* (2013.01)

(58) Field of Classification Search
  CPC ... G01B 11/272; G01B 11/2441; G01B 11/25; G01B 9/02016; G01B 9/02021; G01B 9/02025; G01B 9/02068; G02B 27/62
  See application file for complete search history.

(56) References Cited

U.S. PATENT DOCUMENTS 3,542,476 A * 11/1970 Nord ................ G01B 11/27
                                              356/508
6,847,457 B2   1/2005 Tobiason et al.
(Continued)

FOREIGN PATENT DOCUMENTS

CN     102200432      9/2011    ............. G01B 11/26
CN     109804294      5/2019    ............. G02B 21/06
(Continued)

OTHER PUBLICATIONS

Matthew P. Rimmer, "Computer-aided optical alignment method," Proc. SPIE 1271, Adaptive Optics and Optical Structures, (Aug. 1, 1990); https://doi.org/10.1117/12.20423 (Year: 1990).*
(Continued)

*Primary Examiner* — Kara E. Geisel
*Assistant Examiner* — Jonathon Cook
(74) *Attorney, Agent, or Firm* — Fish & Richardson P.C.

(57) ABSTRACT

Disclosed is a method and apparatus for determining information about an alignment of one or more optical components of a multi-component assembly involving: detecting an optical interference pattern produced from a combination of at least three optical wave fronts including at least two optical wave fronts caused by reflections from at least two surfaces of the one or more optical components; and computationally processing information derived from the detected optical interference pattern with at least one simulated optical wave front derived from a model of at least one selected optical surface of the at least two surfaces to computationally isolate information corresponding to an alignment of the selected optical surface.

32 Claims, 16 Drawing Sheets

(56) References Cited

U.S. PATENT DOCUMENTS

| | | | |
|---|---|---|---|
| 6,924,898 B2* | 8/2005 | Deck | G01B 9/02004 |
| | | | 356/512 |
| 7,643,149 B2 | 1/2010 | Freimann et al. | |
| 7,936,521 B2* | 5/2011 | Arnold | G01B 9/02039 |
| | | | 359/718 |
| 9,766,155 B2 | 9/2017 | Oya et al. | |
| 2005/0225774 A1* | 10/2005 | Freimann | G01M 11/0271 |
| | | | 356/515 |
| 2006/0238773 A1* | 10/2006 | Wellstead | G01B 9/02072 |
| | | | 356/510 |
| 2008/0304080 A1 | 12/2008 | Ueki | |
| 2012/0133924 A1 | 5/2012 | Heinisch et al. | |
| 2013/0157202 A1* | 6/2013 | Kohara | G01M 11/0264 |
| | | | 356/521 |
| 2021/0095955 A1* | 4/2021 | Green | G01M 11/0221 |

FOREIGN PATENT DOCUMENTS

| | | | | |
|---|---|---|---|---|
| DE | 102004029735 | | 9/2011 | ............ G01M 11/02 |
| DE | 102010053422 | | 3/2012 | ............ G01M 11/02 |
| EP | 1 610 089 | A2 | 12/2005 | ............ G01B 11/26 |
| EP | 2 369 319 | | 7/2015 | ............ G01M 11/02 |
| EP | 3 037 800 | A1 | 6/2016 | ............ G01M 11/02 |
| WO | WO 2018/078417 | | 5/2018 | ............ G02B 21/06 |

OTHER PUBLICATIONS

Jaramillo-Nunez A et al: "Apparatus for Cementing Doublet Lenses", Optical Engineering, Soc. of Photo-Optical Instrumentation Engineers, Bellingham, vol. 35, No. 12, Dec. 1, 1996 (Dec. 1, 1996), pp. 3432-3436, XP000678968, ISSN: 0091-3286, DOI: 10.1417/1.601104 (Year: 1996).*

Matthew P. Rimmer, "Computer-aided optical alignment method," Proc. SPIE 1271, Adaptive Optics and Optical Structures, (Aug. 1, 1990); https://doi.org/10.1117/12.20423 (Year: *).*

The International Search Report and Written Opinion for International Application No. PCT/US2022/037777, dated Jan. 11, 2023.

Jaramillo-Nunez et al., "Apparatus for cementing doublet lenses", *Society of Photo-Optical Instrumentation Engineers*, vol. 35, No. 12, pp. 3432-3436 (Dec. 1996).

Hotate et al., "Phase-modulating optical coherence domain reflectometry by synthesis of coherence function", *Electronics Letters*, vol. 31, No. 6, pp. 475-476 (Mar. 16, 1995).

Millerd et al., "Pixelated phase-mask dynamic interferometer", *Interferometry XII: Techniques and Analysis, Proc. SPIE*, vol. 5531, pp. 304-314 (2004).

Parks, "Precision cementing of doublets without using a rotary table", *Procc SPIE*, vol. 11487, Optical Manufacturing and Testing XIII, (Aug. 20, 2020).

Salsbury et al., "Spectrally controlled interferometry for measurements of flat and spherical optics", *Proceedings of SPIE*, vol. 10448, pp. 104481C-1-104481C-7 (2017).

The Office Action and Search Report issued by the Taiwan Patent Office for Application No. TW 111127694, dated Dec. 27, 2023 (With English Translation).

The International Preliminary Report on Patentability for International Application No. PCT/US2022/037777, dated Feb. 8, 2024.

* cited by examiner

INTERFEROMETRIC LENS ALIGNER AND METHOD

CROSS-REFERENCE TO RELATED APPLICATIONS

This application claims priority to U.S. provisional application No. 63/226,449 filed Jul. 28, 2021, the contents of which are incorporated herein in their entirety.

FIELD

This disclosure relates interferometric systems and methods for aligning components of a multi-component optical assembly.

BACKGROUND

The performance of optical systems, including, for example, the resolution of an imaging system, depends not only on their nominal designs but also on the precision by which they can be assembled. The calculated spots size of a standard 100-mm focal length (f), 12-mm diameter (D), two-element achromatic lens, for example, increases two to five-fold when there is a tilt of only 0.1° between the optical axes of the two elements. Similar calculations can be done for more complicated optical systems and applying various performance parameters. While mechanical tolerancing and racking optical components can sometimes provide adequate positioning, active optical alignment is usually required for higher performance systems. Generally, the better one can measure and therefore control physical alignment parameters of an optical system, the better the performance of the optical system will be.

With a lens assembly on a rotating stage, lens components can be aligned using dial indicators. However, problems related to this method include: limited access to lenses in a barrel, mechanical contact with optical surfaces, and lateral forces on the parts as a result of the measurement.

One non-contact method used pervasively today for the purpose of lens alignment uses a point source microscope incorporating an auto-collimator in conjunction with a so-called head lens to provide a confocal condition in which the light projected by the cross-hair (or point source) and reflected normally from a specific surface in the optical system comes into focus on a camera chip. The radial run-off of the cross-hair or point source image measured while rotating the lens system on an air bearing provides information about the tilt or centration of the observed surface. (See, e.g., U.S. Pat. No. 9,766,155.)

Another method uses an axicon in the illumination path such that the light reflected off a single surface does not form a single focus but an elongated focal line. In cases where the focal lines extend far enough along the direction of the optical axis, multiple spots corresponding to the surfaces of interest can be observed at the same time and visually brought to the best possible overlap. (See, e.g., Robert E. Parks, "Precision cementing of doublets without using a rotary table", Proc. SPIE 11487, Optical Manufacturing and Testing XIII, 114870U (20 Aug. 2020).)

Yet another method uses an interferometer in conjunction with a selectable, computer-generated hologram for shaping a beam of measuring light to be incident on surfaces of the optical elements under test. (See, e.g., U.S. Pat. No. 7,643,149.)

SUMMARY

In general, in one aspect, disclosed is a method for determining information about an alignment of one or more optical components of a multi-component assembly. The method includes: a) detecting an optical interference pattern produced from a combination of at least three optical wave fronts including at least two optical wave fronts caused by reflections from at least two surfaces of the one or more optical components; and b) computationally processing information derived from the detected optical interference pattern with at least one simulated optical wave front derived from a model of at least one selected optical surface of the at least two surfaces to computationally isolate information corresponding to an alignment of the selected optical surface.

Embodiments of the method may include one or more of the following features.

The computationally isolated information may correspond to a spatial frequency distribution having a dominant peak corresponding to the relative alignment of the selected optical surface. In certain embodiments, the spatial frequency distribution is represented by an intensity image. For example, the processing may include a transformation into spatial frequency coordinates to yield the computationally isolated information corresponding to the intensity image having the dominant peak, and wherein a position and/or shape of the dominant peak in the intensity image provides the information about the relative alignment of the selected optical surface.

The method may further include using the computationally isolated information to determine whether the alignment of the one or more optical components of the multi-component assembly is within a specification tolerance.

The method may further include adjusting a position of the optical component including the selected optical surface relative to another component in the multi-component optical assembly based on the computationally isolated information. Moreover, in some such embodiments, the other component in the multi-component optical assembly is removed from a fixtured position in the optical assembly prior to the detection of the optical interference pattern and is reinserted back into the optical assembly at the fixtured position after the detection of the optical interference pattern. For example, the method may further include measuring the position of the other component prior to its removal from the optical assembly, and the adjusting of the position of the optical component including the selected optical surface may be based on the computationally isolated information and the measured position for the other component. Detecting the optical interference pattern may include detecting the optical interference pattern as function of time. For example, detecting the optical interference pattern may include phase-shifting at least one of the three optical wave fronts to produce a time-varying optical interference pattern.

The multi-component assembly may include a lens and a lens holder, and wherein the three optical wave fronts are caused by reflections from each of front and back surfaces of the lens and a reference surface of an interferometric assembly used to produce the optical interference pattern.

The multi-component assembly may include multiple optical components and wherein the at least two optical surfaces of the one or more optical components include at least two optical surfaces from different optical components.

The method may further include combining the at least two optical wave fronts caused by reflections from the at least two surfaces with a reference optical wave front derived from a common light source to produce the optical interference pattern. For example, the method may further include generating the reference optical wave front by causing light from the common light source to reflect from a reference surface of an interferometric assembly used to produce the optical interference pattern. Also, the common light source may have a coherence length smaller than an optical distance between two adjacent optical surfaces in the multi-component assembly. For example, the coherence length may be less than about 1.5 mm. Alternatively, for example, the coherence length may be greater than an optical distance between two adjacent optical surfaces in the multi-component assembly and smaller than an optical distance between two non-adjacent optical surfaces in the multi-component assembly. For example, the coherence length may be between about 2 mm and about 50 mm.

Detecting the optical interference pattern includes recording a spatially resolved intensity profile for the optical interference pattern. Furthermore, in some embodiments, detecting the optical interference pattern may include recording a spatially resolved amplitude and phase profile for the optical interference pattern.

The model may include information sufficient to estimate a phase profile for an optical wave front reflected from the selected optical surface. For example, the method may further include combining the at least two optical wave fronts caused by reflections from the at least two surfaces with a reference optical wave front derived from a common light source to produce the optical interference pattern, and wherein the model further includes information sufficient to estimate a phase profile for the reference optical wave front. Also, for example, the at least one selected optical surface may include two selected optical surfaces, and wherein the model includes information to estimate phase profiles for optical wave fronts reflected from the two selected optical surfaces, respectively. The known information about the at least one selected optical surface may include information about a radius of curvature and any aspheric coefficients for the at least one selected optical surface. For example, the simulated optical wave front may include a phase variation corresponding to a phase difference between the estimated phase profile and one other phase profile (e.g., a phase profile of a reference wave front, such as a flat wave front).

In certain embodiments of the method, the information derived from the detected optical interference pattern is a spatially-resolved intensity profile or a spatially-resolved complex amplitude profile, and the computational processing includes multiplying the spatially-resolved intensity profile or the spatially-resolved complex amplitude profile by the simulated optical wave front and transforming a spatially resolved product from the multiplication from spatial coordinates to spatial frequency coordinates to yield an intensity image in the spatial frequency coordinates having a dominant peak corresponding to the selected optical surface. For example, the transforming may include a two-dimensional Fourier transform. The computational processing may further include estimating a tilt and/or decenter of the selected surface from a specified alignment based on a position of at least the dominant peak in the intensity image relative to a center of the intensity image. Also, the computational processing may further include estimating an axial alignment error of the selected surface from a specified alignment based on a blurring of at least the dominant peak in the intensity image.

The method may further include repeating the computational processing with an iteratively improved simulated optical wave front for the selected optical surface, wherein the iteratively improved simulated optical wave front is derived from the model about the selected optical surface and the previously yielded computationally isolated information providing information about the relative alignment of the selected optical surface.

Furthermore, the method may further include repeating the processing for at least one additional selected optical surface to thereby determine the computationally isolated information for each of multiple selected optical surfaces. For example, the processing of the multiple selected optical surfaces may include a regression analysis to contemporaneously determine information about the alignments of the multiple selected optical surfaces based on the computationally isolated information and the model for the multiple selected optical surfaces. The method may then include adjusting a position of each of the multiple optical components based on the computationally isolated information about the multiple selected optical surface alignments.

The method may include illuminating the multi-component assembly with at least two measurement beams at a non-zero angle $\alpha$ to one another to produce the optical interference pattern. Furthermore, the computational processing may further include determining a radius of curvature for the selected optical surface based on information in a computationally isolated hologram for the selected surface and the non-zero angle $\alpha$.

The method may further include illuminating the multi-component assembly with two measurement beams having different wavelengths to produce the optical interference pattern with corresponding reference beams also having the different wavelengths.

The method may further include illuminating the multi-component assembly with a measurement beam having a structured spatial profile to produce the optical interference pattern.

The method may further include illuminating the multi-component assembly with a measurement beam to produce the optical interference pattern with a reference beam, wherein an intensity of the measurement beam is increased relative to an intensity for the reference beam.

In another aspect, disclosed is an apparatus for determining information about an alignment of one or more optical components of a multi-component assembly. The apparatus includes: a) an interferometric optical system for detecting an optical interference pattern produced from a combination of at least three optical wave fronts including at least two optical wave fronts caused by reflections from at least two surfaces of the one or more optical components; and b) one or more electronic processors coupled to the interferometric optical system and configured to computationally process information derived from the detected optical interference pattern with at least one simulated optical wave front derived from a model of at least one selected optical surface of the at least two surfaces to computationally isolate information corresponding to an alignment of the selected optical surface.

Embodiments of the apparatus may include one or more of any of the features recited above for the corresponding method.

In general, in another aspect, disclosed is a method for determining information about a curvature of an optical test surface. The method includes: a) providing a reference wave front and at least two measurement wave fronts all derived from a common coherent light source; b) illuminating the optical test surface with the two measurement wave fronts at an angle $\alpha$ to one another; c) interfering the two measurement wave fronts with the reference wave front after the measurement wave fronts reflect from the optical test surface to form an optical interference pattern on a camera; and d) electronically processing information about the optical interference pattern recorded by the camera to determine the information about the curvature of the optical test surface.

Embodiments of the method may include one or more of the following features.

The electronic processing of the information about the optical interference pattern may include determining a distance s between centers of two sets of circular fringes formed by the reference wave front and each of the measurement wave fronts reflected from the optical test surface.

For example, the electronic processing of the information about the optical interference pattern may further include determining the information about the curvature based on the determined distance s and known information about the angle α between the two measurement wave fronts illuminating the optical test surface. For example, the electronic processing of the information about the optical interference pattern may include determining a radius of curvature (ROC) of the optical test surface based on the equation:

$$ROC = \frac{s}{2\sin\frac{\alpha}{2}}.$$

Alternatively, the electronic processing may include computationally processing the information about the optical interference pattern with at least a first simulated optical wave front derived from a model of the test surface to computationally isolate information corresponding to the test surface illuminated with only the first measurement wave front and then computationally processing the information about the optical interference pattern with at least a second simulated optical wave front derived from the model of the test surface to computationally isolate information corresponding to the test surface illuminated with only the second measurement wave front.

Moreover, the test surface may be part of a test object including multiple surfaces, and the electronic processing may further include computationally processing the information about the optical interference pattern with at least one simulated optical wave front derived from a model of the test surface to computationally isolate information corresponding to the test surface versus other surfaces of the test object.

One or more optical fibers may be used to deliver one or both of the measurements wave fronts from the coherent light source toward the test surface. Also, an optical fiber may be used to deliver the reference wave front from the coherent light source toward the camera.

In another aspect, disclosed is an apparatus for determining information about a curvature of an optical test surface. The apparatus includes: a) an interferometric optical system providing a reference wave front and at least two measurement wave fronts all derived from a common coherent light source, illuminating the optical test surface with the two measurement wave fronts at an angle α to one another, and interfering the two measurement wave fronts with the reference wave front after the measurement wave fronts reflect from the optical test surface to form an optical interference pattern on a camera; and b) one or more electronic processors for processing information about the optical interference pattern recorded by the camera to determine the information about the curvature of the optical test surface.

Embodiments of the apparatus may include one or more of any of the features recited above for the corresponding method.

All documents referred to herein are incorporated by reference in their entirety. In case of conflict with the present disclosure, and any document incorporated by reference, the present disclosure controls.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 11A illustrates a first iteration of the numerical processing, and FIG. 11B illustrates a second iteration of the numerical processing based on improved estimates from the first iteration.

Like reference symbols in the various drawings indicate like elements.

DETAILED DESCRIPTION

Embodiments disclosed herein relate to methods and system for aligning components of a multi-component optical assembly with one another, for example, aligning different optical elements of a multi-element lens system. The system includes a coherent light source configured to illuminate an optical assembly of one or more optical components (such as lenses or mirrors), an optional means for creating reference light from the same source, and a detector for recording intensity patterns arising from the superposition of light reflected from the various surfaces of the optical components in the optical assembly and the optional reference light. An electronic processor runs algorithms to analyze the interference intensity pattern created at the detector (also referred to herein as a "hologram") and uses light field simulations to identify light patterns corresponding to two or more of the surfaces of the optical components, and to determine the degree of alignment of the optical components, including for example the relative tilt or decenter of the surfaces of the optical components with respect to each other.

Figure 1:
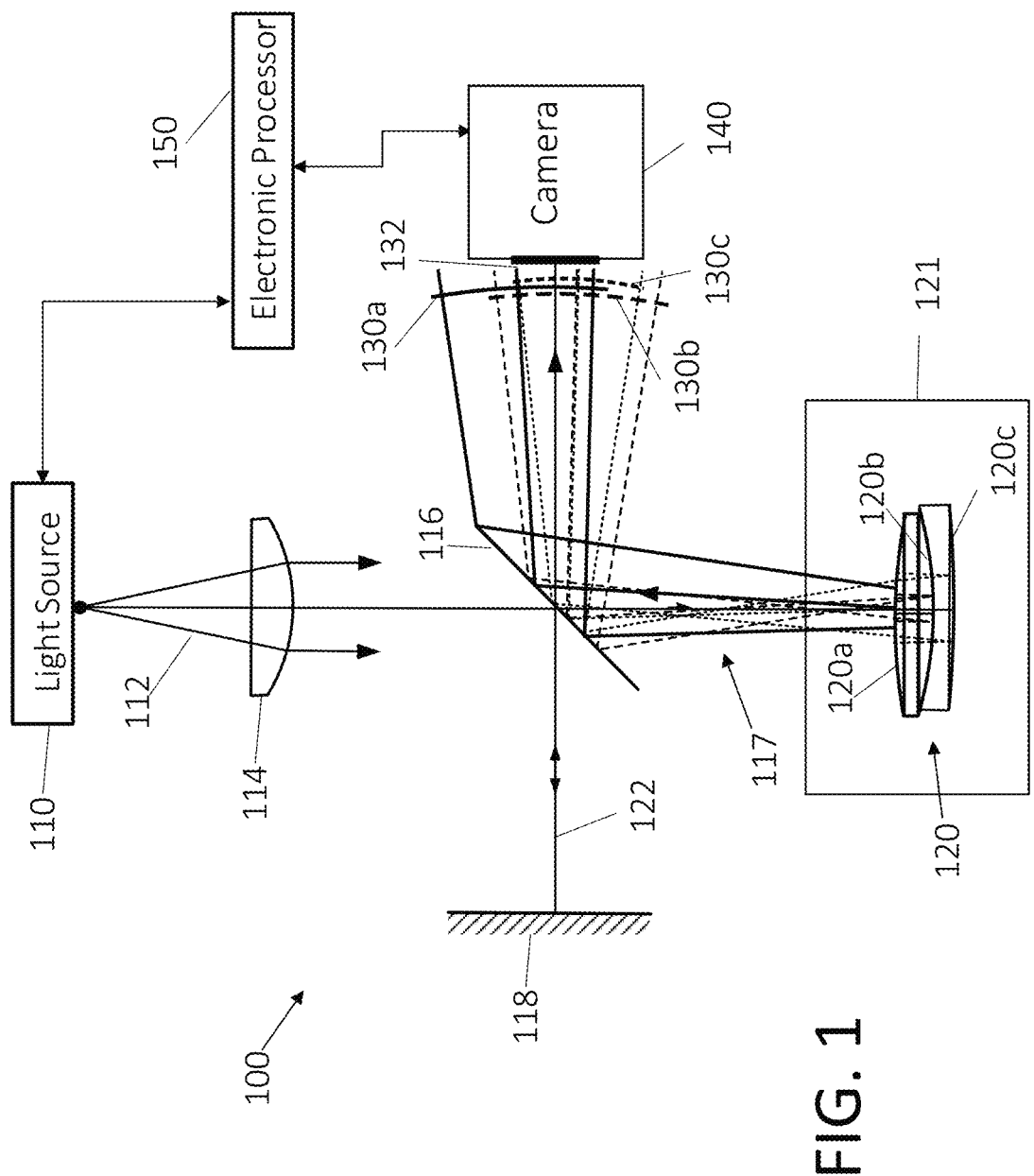
FIG. 1 is a schematic diagram of one embodiment of an interferometric optical system for measuring the alignment of different surfaces of a multi-component optical assembly under test.

FIG. 1 is a schematic diagram of an optical system 100 for optically illuminating an optical assembly 120 comprising multiple components each having a corresponding reflective or partially reflective (hereinafter referenced to simply as "reflective") surface 120a, 120b, and 120c. Optical system 100 is based on a Michelson-type interferometer, however, other embodiments may include different types of interferometric systems, including, but not limited to, the additional embodiment described further below.

Optical system 100 includes a coherent light source 110 for generating illumination light 112. For example, the coherent light source may be any of a light-emitting diode, a super-luminescent diode, a single-mode laser, a multimode laser, an incandescent bulb, or any other source that has an emission spectral bandwidth and/or source shape that determines a coherence length. The coherence length of the coherent light source is selected to be sufficiently long to produce interference fringes corresponding to all of the surfaces of interest of the optical assembly under test. Additional embodiments based on a shorter coherence length to isolate only a single surface of interest is discussed in an embodiment further below.

Referring still to FIG. 1, a collimation optic 114 collimates illumination light 112 from light source 110, which is then split by a beam splitter 116 into measurement light 117 that is directed to optical assembly 120 and reference light 122 directed to a flat reference mirror 118. Measurement light 117 is partially reflected by each of the multiple surfaces 120a, 120b, and 120c of the optical assembly to produce corresponding measurement wave fronts 130a, 130b, and 130c, which are reflected by beam splitter 116 toward a camera 140. Reference light 122 is reflected by flat reference mirror 118 and transmitted by beam splitter 116 toward camera 140 and forms a nominally flat reference wave front 132 at camera 140. An electronic processor 150 is coupled to camera 140, which measures an intensity pattern produced by a superposition of the measurement wave fronts 130a, 130b, and 130c and the reference wave front 132, and provides electronic information corresponding to the measurement of this interference intensity pattern to the electronic processor 150 for analysis. Camera 140 is typically a multi-element detector based on photo-sensitive integrated circuit elements, such as a CCD, CMOS or CID camera.

Typically, the optical surfaces 120a, 120b, 120c of multi-component optical assembly 120 each are spherical with curvatures that are known to within a design tolerance. The task is to ensure the optical surfaces are properly aligned and positioned with one another, including, for example, having each such surface aligned along a common optical axis for the assembly as a whole. The system 100 in this embodiment also includes a rotatable and translatable stage 121 for positioning optical assembly 120 relative to the rest of the interferometric system. For example, the stage 121 can align the optical assembly relative to beam splitter 116 and reference surface 118 so that the interference fringes produced by the interference of any one of the measurement wave fronts reflected off optical surfaces 130a, 130b, and 130c and the reference wave front 132 are centered on the camera 140 with as much radial symmetry as possible for the given optical assembly. The spacing of the circular fringes depends on the curvatures of the corresponding optical surfaces of optical assembly 120, the propagation through the interferometric optical system and shape of the nominally flat surface of reference surface 118.

Figure 2A:
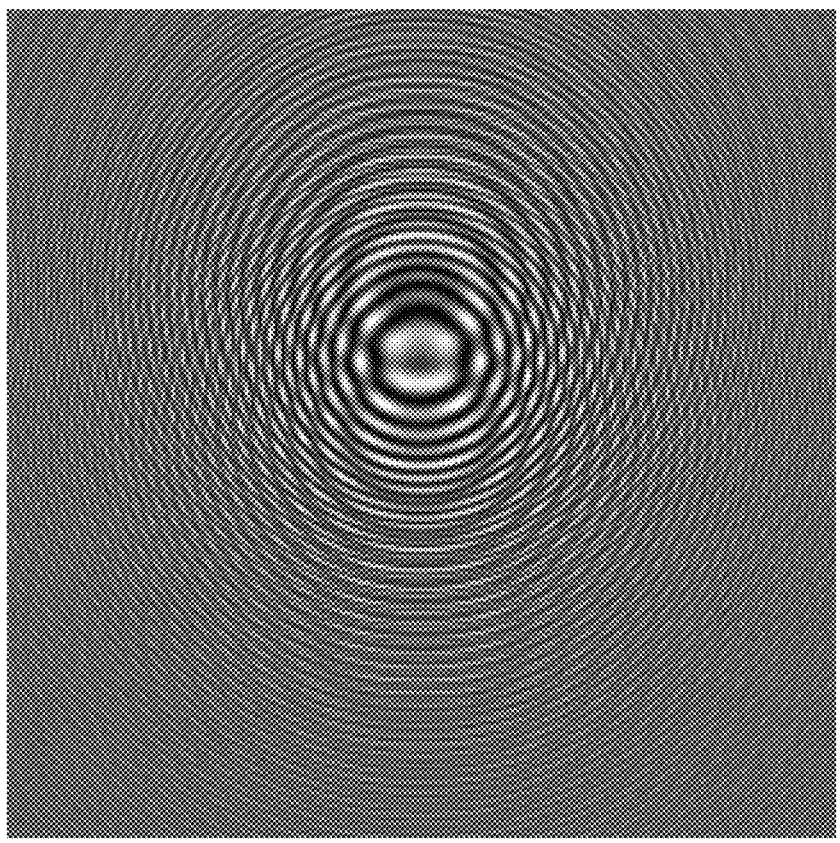
FIGS. 2A and 2B are simulated camera images of an interference intensity pattern produced by the optical system of FIG. 1 when the surfaces of the multi-component optical assembly under test are not aligned (FIG. 2A) and aligned (FIG. 2B).
Figure 2B:
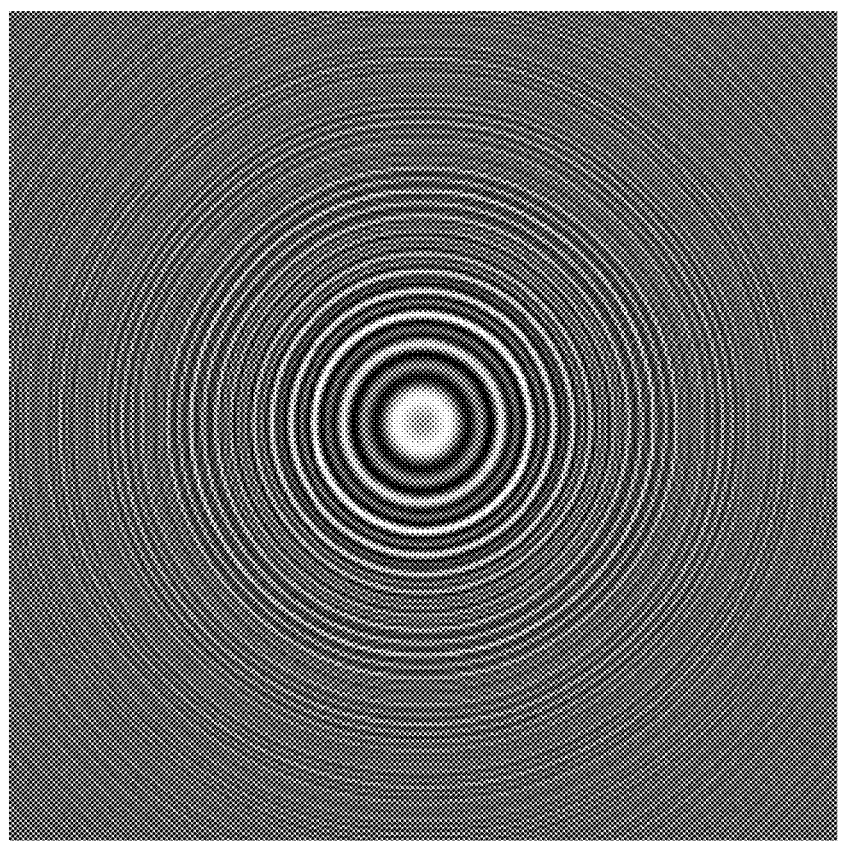

FIGS. 2A and 2B are two simulated camera images of interference intensity patterns of optical assembly 120 measured by system 100 for different alignments of the surfaces 120a, 120b, 120c. FIG. 2A corresponds to the interference intensity pattern when the different surfaces 120a, 120b, 120c are not aligned with one another. Multiple sets of misaligned roughly circular fringes are visible and each corresponds to a different interfering pair of wave fronts at the camera. FIG. 2B corresponds to the interference intensity pattern when the different surfaces 120a, 120b, 120c are aligned with one another and also aligned, via stage 121, with an interferometer axis to center the image as a whole on the camera. Now the interference intensity pattern as whole is radially symmetric—the fringes corresponding to each pair of interfering wave fronts are aligned with one another. Unfortunately, aligning the different surfaces of the optical assembly with one another based only a visual inspection of such camera images is not expected to provide sufficient accuracy for many applications. Accordingly, embodiments provided herein provide further electronic analysis of the recorded interference intensity images by electronic processor 150.

Mathematically, the superposition of the various waves on camera 140 can be expressed as sum of optical fields f from the reference (indicated by subscript r) and all measurement wave fronts (indexed i and later also j, both going from 1 to N, the number of contributing lens surfaces):

$$f(x, y) = f_r(x, y) + \sum_i f_i(x, y) = a_r(x, y)e^{i\varphi_r(x,y)} + \sum_i a_i(x, y)e^{i\varphi_i(x,y)} \quad (1)$$

where $\alpha$ is for amplitude and $\varphi$ for the phase, which are both field dependent as denoted by the coordinate (x,y) corresponding to different spatial locations on the camera. Explicit field dependence is dropped from here on for ease of expression. The corresponding intensity I measured by the camera is the square of the field magnitude:

$$I = \left(a_r e^{i\varphi_r} + \sum_i a_i e^{i\varphi_i}\right) * \left(a_r e^{-i\varphi_r} + \sum_i a_i e^{-i\varphi_i}\right) = \quad (2)$$

-continued $$a_r^2 + \sum_i a_i^2 + \sum_i 2a_r a_i \cos(\varphi_r - \varphi_i) + \sum_{i \ne j} 2a_i a_j \cos(\varphi_i - \varphi_j)$$

In classical holography, a physical recording of the intensity would be made that would then be illuminated with the original reference wave (a mathematical equivalent of a multiplication with $a_r e^{i\varphi_r}$) to create a multitude of waves, including replicas of the N measurement waves, i.e. the hologram reconstruction. For the purpose of at least some embodiments of this invention and in its preferred embodiment, however, the recorded intensity pattern is multiplied for one i at a time in software with complex terms $\tilde{f}_i(x,y) = e^{-i(\tilde{\varphi}_r - \tilde{\varphi}_i)}$ that contain estimates of the reference wave phase $\tilde{\varphi}_r$ and the N measurement wave phases $\tilde{\varphi}_i$, resulting again in many terms (13 terms if N=3), but this time including the test terms:

$$t_i = \alpha_r \alpha_i e^{i(\varphi_r - \tilde{\varphi}_r + \tilde{\varphi}_i - \varphi_i)} \quad (3)$$

which in the case of a well-aligned flat reference wave (as shown in the example of FIG. 1) simplifies to:

$$t_i = \alpha_r \alpha_i e^{i(c + \tilde{\varphi}_i - \varphi_i)} \quad (4)$$

with c being an unknown phase offset. In other words, if the estimate of a particular measurement wavefront is perfectly correct, the corresponding test term becomes the product of the reference and measurement wave amplitudes times a complex constant. A subsequent Fourier transform creates a tall peak in the center of the frequency space.

In general and especially in the beginning of the process where the alignment parameters of the lens are still only estimates, however, there are a discrepancies between the estimated $\tilde{\varphi}_i$ and the actual $\varphi_i$. Small tilt and decenter alignment errors to first order create phase discrepancies that can very closely be described as a phase tilt as in:

$$t_{i,decenter/tilt} = \alpha_r \alpha_i e^{i(\tilde{\varphi}_i - \varphi_i)} \approx \alpha_r \alpha_i e^{i(c_0 + c_x x + c_y y)} \quad (5)$$

The Fourier transform now still results in a very confined peak but not exactly in the center. The coordinates of the off-center peak in the Fourier domain (corresponding to the quantities $c_x$ and $c_y$) are measures for the decenter or tilt misalignment of one or more components in the optical system. If the spot location sensitivities to misalignment parameters are known, quantitative tilt and decenter corrections can be derived and applied to the model of the lens, which will result in a peak much closer to the center in the next iteration of the algorithm. For the surface closest to the interferometric system, the observed phase tilt's relations to surface decenter or tilt can be expressed as relatively simple analytical expressions. A non-zero $c_x$, for example, either originates from a decenter in x by distance $$c_x * k^{-1}\left(\frac{R}{2} + D\right)$$

or from a tilt in x (around the y axis) by the angle $$c_x * k^{-1}\left(\frac{1}{2} + \frac{D}{R}\right),$$

where k is the wavenumber of the light source, R is the surface's radius of curvature and D is the distance between the surface and the camera. For surfaces other than the first surface, the relations become significantly more complicated as the observed phase tilt depends on all surfaces that are transmitted before and after the reflection off the surface in question. Since decenter and tilt affect the observed phase tilts in similar ways, a distinction between the two often requires the measurement of both surfaces of a lens element plus the knowledge of additional parameters such as the radii of curvature, center thickness and the refractive index of said lens element.

Axial alignment errors of the selected surface (i.e., an error in the position of the surface along the common optical propagation axis) introduce parabolic phase errors in a 2nd-order approximation of the test term of Eqn. (4) and are characterized by the coefficient $c_2$:

$$t_{i,axial\ shift} = \alpha_r \alpha_i e^{i(\tilde{\varphi}_i - \varphi_i)} \approx \alpha_r \alpha_i e^{ic_2(x^2 + y^2)} \quad (6)$$

The Fourier transform now reveals a blurred spot that indicates that corrections to the lens' model are required to get the Fourier spot to be better confined. Specifically, an axial adjustment is required corresponding, and in linear proportion, to the non-zero coefficient $c_2$. The magnitude of the axial adjustment is $$c_2 * 2k^{-1}\left(\frac{R}{2} + D\right)^2$$

for the first surface and, like before, the expressions become significantly more complex for the surfaces other than the first. Considering the complexity of the terms and the desire to keep the methods as general as possible, it becomes more practical to determine the relations numerically by means of optical simulation.

Figure 3:
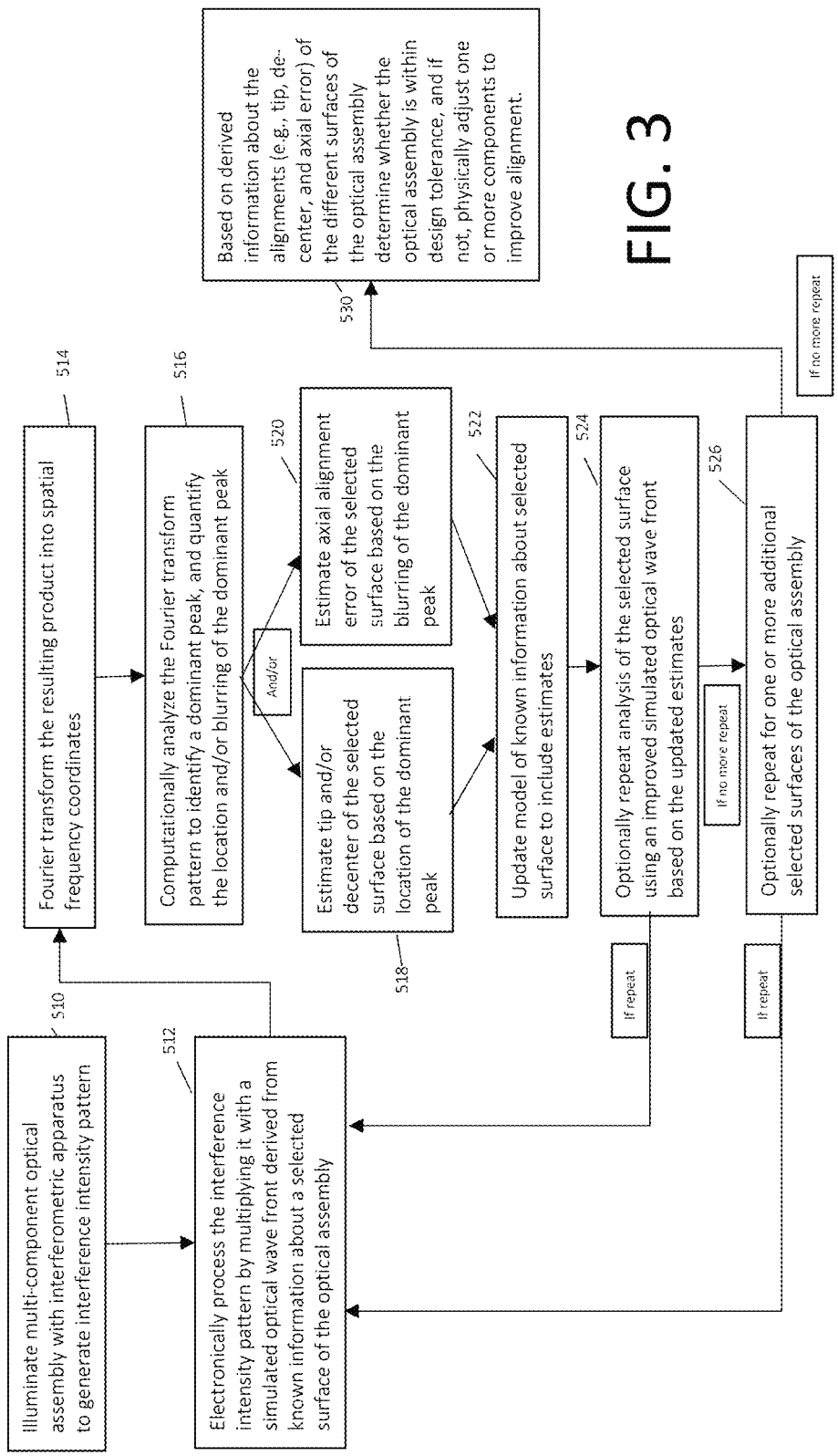
FIG. 3 is a schematic diagram of a flow chart showing one embodiment of a method processing an interference pattern measured by an interferometric optical system such as that in FIG. 1.

In certain embodiments, the analysis steps can be summarized as set forth in the flow chart of FIG. 3. In step 510, one illuminates multi-component optical assembly 120 with an interferometric apparatus such as system 100 to generate the interference intensity pattern resulting from the superposition of the different wave fronts. In step 512, the electronic processor processes the interference intensity pattern by multiplying it with a simulated optical wave front derived from known information about a selected surface of the optical assembly. For example, this results in a product with terms like those in Equations (3) and (4) above. In step 514, the electronic processor Fourier transforms the product, which will produce a dominant peak because the more accurate the estimate for the simulated wave front the more closely the phase terms in Equations (3) and (4) null to zero plus a phase constant. In step 516, the electronic processor analyzes the Fourier transform pattern to identify a dominant peak and quantify the location and/or blurring of the dominant peak. For example, in step 518, analysis of the location of the peak in the spatial frequency coordinates of the Fourier transform patterns provides values for the coefficients $c_x$ and $c_y$, which are indicative of tip and/or decenter of the selected surface, as set forth in Equation (5). Similarly, for example, in step 520, analysis of the blurring of the dominant peak in Fourier transform pattern is quantified to estimate the coefficient $c_2$, which linearly proportional to an error in the axial positioning of the selected surface, as indicated by Equation (6). In step 522, the estimates derived from steps 518 and 520 are used to update the model representing the alignment and positioning of the different surfaces of the multi-component optical assembly.

In step 524, the estimates for the selected surface can be optionally further improved by repeating steps 512-522 for the same selected surface, but using a simulated wave front that includes the estimates for decenter and/or tilt and/or axial misalignment to thereby produce a term in the product with even less phase variation across the field, and thereby generate an even sharper, more-centered peak in the Fourier transform pattern. Further estimates of decenter and blurring of this peak provide further iterative corrections to the model. Otherwise, in step 526, steps 512-524 are optionally repeated for one or more additional selected surfaces of the optical assembly to thereby provide information about those one or more additional selected surfaces. When the analysis is done sequentially in this way, the first selected surface is typically the one closest to the interferometer so that the analysis and generation of the simulated wave front is not complicated by any intervening surfaces and incomplete information about the alignment and positioning of such surfaces. Subsequent selected surfaces are then chosen with increasing distance from the interferometer and the analysis and generation of the simulated wave front uses the more accurate modeling for any intervening surface resulting from the prior analysis. Then, in step 530, based on derived information about the alignments (e.g., tip/tilt, de-center, and axial error) of the different surfaces of the optical assembly, a user and/or the electronic processor can determine whether the optical assembly is within design tolerance, and if not, an operator or automated manipulator (or robot) can physically adjust one or more components to improve alignment.

In yet further embodiments, the analyses of the different selected surfaces can be carried out in parallel as part of global optimization process. For example, in certain embodiments, in the first or in each iteration of the optimization process, the electronic processor will use optical modeling (e.g., ray tracing) to determine a Jacobian matrix J that contains partial derivatives of all observables (such as the spot positions in x and y and numerical representations of spot blurring after the above mentioned Fourier transforms) with respect to alignment parameter changes. In the Equations below, the observables are represented by elements of an m-element vector s, and the alignment parameters are tip/tilt/Z-positions of lens surfaces or, when necessary or desired, x/y/z/tip/tilt values of lens elements (defined by two surfaces each), are represented by the n-element vector e. The Jacobian matrix J can be expressed as:

$$J = \begin{bmatrix} \frac{\partial s_1}{\partial e_1} & \cdots & \frac{\partial s_1}{\partial e_n} \\ \vdots & \ddots & \vdots \\ \frac{\partial s_m}{\partial e_1} & \cdots & \frac{\partial s_m}{\partial e_n} \end{bmatrix} \quad (7)$$

The vector e representing the values by which parameter estimates need to be changed is now derived by solving the equation system:

$$J \cdot e = s \quad (8)$$

for e. The model m (a vector, of which the elements represent the current model parameters) is updated with a new estimate $$m \rightarrow m - e \quad (9)$$

The process is repeated until, after a few iterations, the parameter estimates have stabilized.

Figure 4:
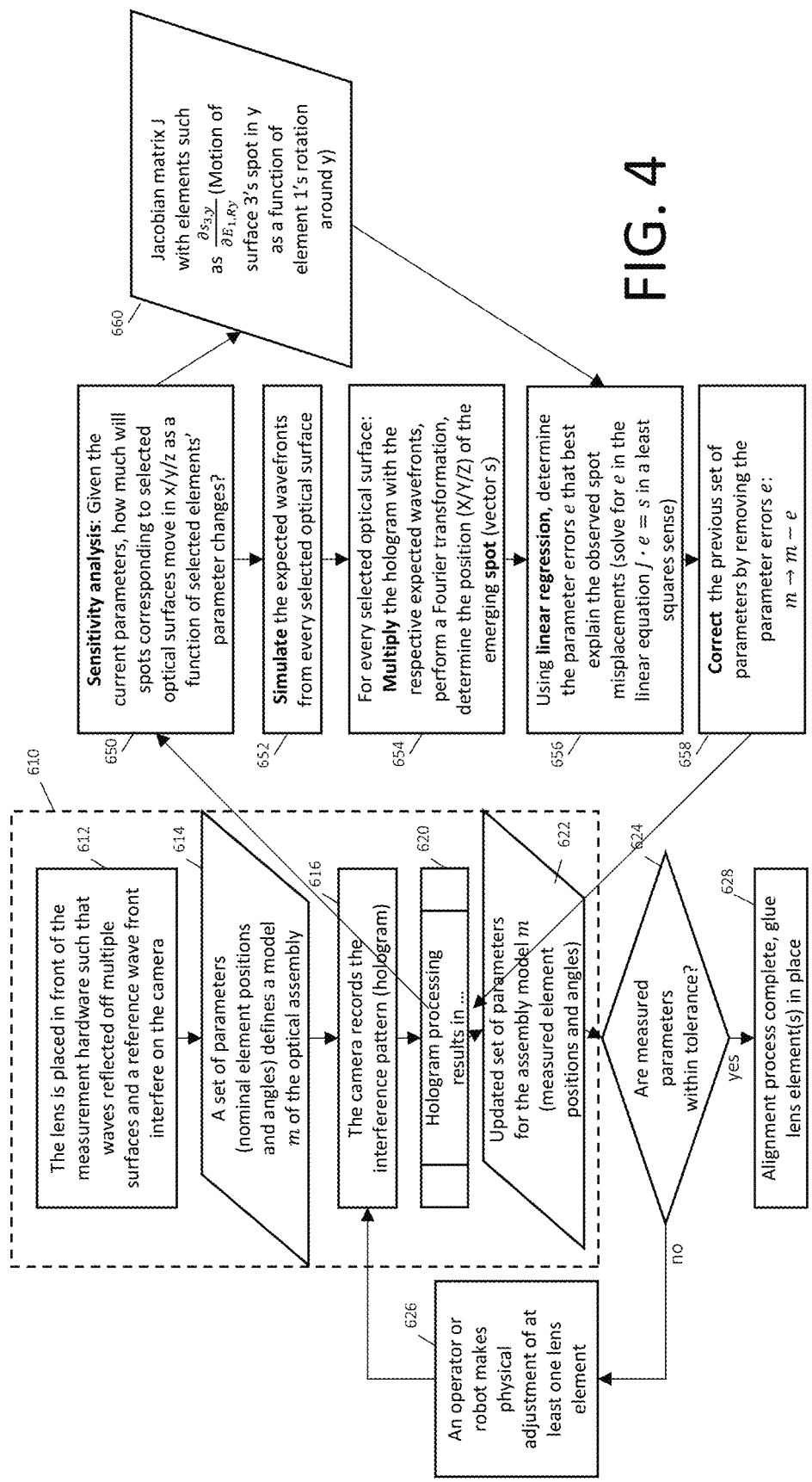
FIG. 4 is a schematic diagram of a flow chart showing another embodiment of a method processing an interference pattern measured by an interferometric optical system such as that in FIG. 1.

This global optimization process is exemplified by the flow chart in FIG. 4. The core measurement procedure 610 includes steps 612-622. In step 612, the multi-component optical assembly 120 (the "lens") is placed in front of the measurement hardware (e.g., interferometric optical system 100) such that waves reflected off multiple surfaces and a reference wave front interfere on the camera. In step 614, a set of parameters (nominal element positions and angles) defines a model m of the optical assembly. Also generally known are the design curvatures and the refractive indices of the individual elements. In step 616, the camera records the interference pattern (that is, the "hologram"). In step 620, the electronic processor processes the hologram, as set forth, for example, by steps 650-660 described further below, to provide improved estimates for the element positions and angles. Based on this processing, in step 622, the model m is updated to provide a more accurate assessment of the measured element positions and angles. In step 624, a user or the electronic processor determines whether the measured parameters are within tolerances. If not, in step 626, an operator or robot makes physical adjustment of at least one lens element. If yes, in step 628, the alignment process is complete and the elements can be permanently fixed together (e.g., by glue or other fasteners).

The processing of the hologram in step 620 includes the following steps. First, in step 650, known and estimated information about the optical assembly is provided to optical modeling (e.g., ray-tracing) software to determine the sensitivity matrix J. Specifically, given the current parameters, this matrix indicates how much spots in the Fourier transformed product corresponding to selected optical surfaces move in x/y/z (z is a measure of the spot blurring) as a function of selected elements' parameter changes. For example, as indicated by inset 660, the element $$\frac{\partial s_{3,y}}{\partial e_{1,Ry}}$$

in sensitivity matrix J corresponds to the motion of surface 3's spot in the y spatial frequency coordinate of the Fourier transformed product as a function of element 1's rotation around the y coordinate axis. In step 652, the electronic processor simulates the expected wave front for every optical surface that contributes to the hologram, using known information about the individual surfaces curvatures, and alignment estimates from the model m. In step 654, for every such optical surface, the electronic processor multiples the recorded hologram with the respective expected wave fronts, performs a Fourier transformation, and determines the position (X/Y/Z) of the emerging spot of every such surface, thereby providing the elements of vector s. In step 656, the electronic processor implements a regression analysis to determine the parameter errors e that best explain the observed spot misplacements. For example, the regression can solve for e in the linear equation J·e=s using a least squares analysis. In step 658, the electronic processor corrects the previous set of parameters for the model m by removing the parameter errors e.

Advantages of the processing methods above include that, as long as the wave fronts can be correctly modeled (with the help of raytracing, for example), the signal in the Fourier domain will be a confined spot, whereas the spots seen in prior art methods, e.g., with a state-of-the-art point source microscope and head lenses can produce aberrated spots of which the localization can become compromised.

Further embodiments include different processing methods. For example, the optical field captured by the hologram can be computationally propagated (e.g. using Fresnel propagation or angular spectrum propagation) to a focal spot, of which the coordinates are compared to the coordinates that an analytical model would predict. Also, other spatial processing techniques can be used on the product without any spatial frequency transformation. For example, the center of circular fringe patterns can be determined using a 2D autocorrelation. In general, embodiments will exploit known information about individual elements to process the hologram with corresponding simulated wave fronts to extract information about the alignment of the elements with one another in collective assembly.

Figure 10:
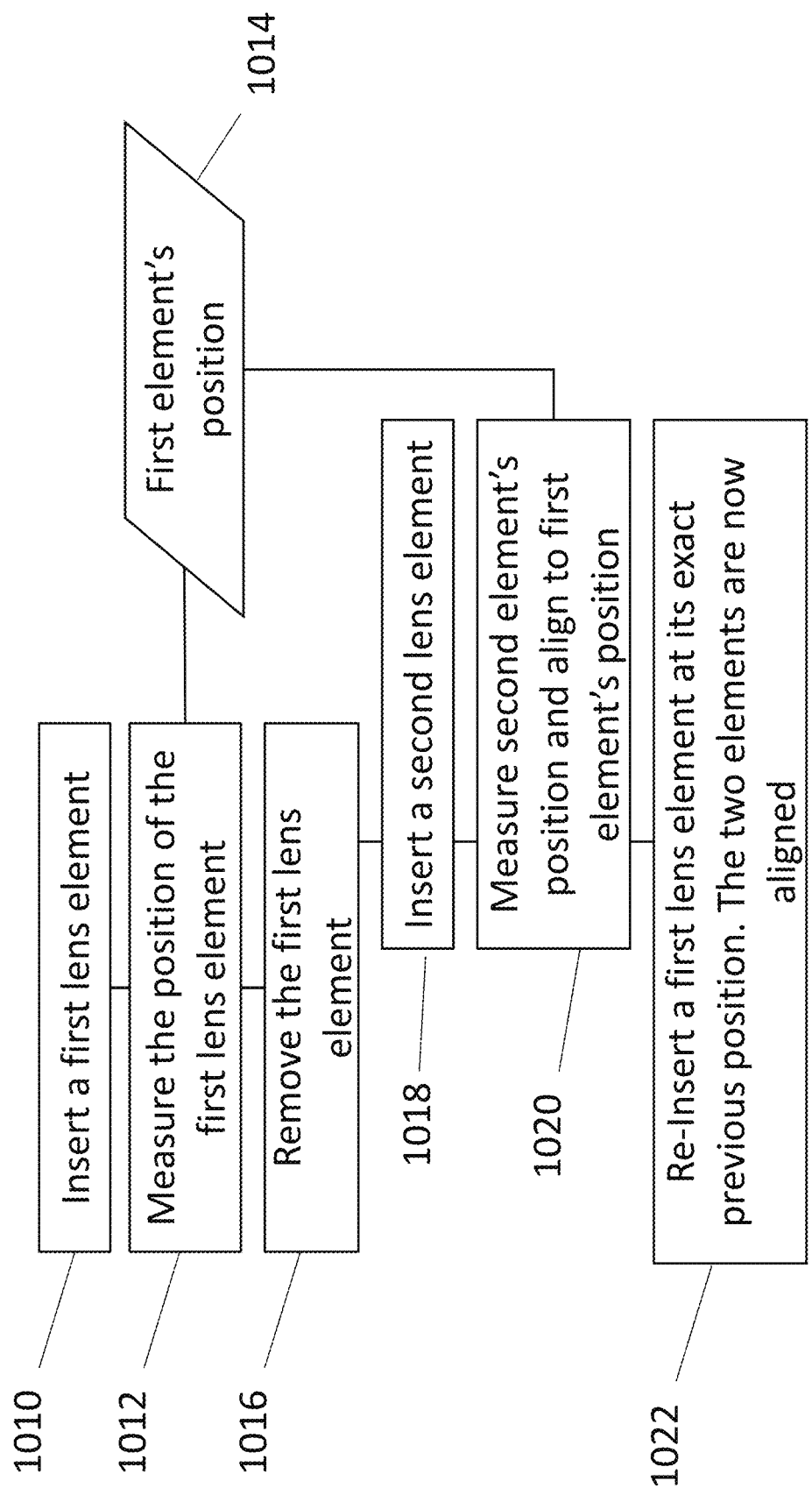
FIG. 10 is a schematic diagram of a flow chart showing another embodiment of a method processing an interference pattern measured by an interferometric optical system such as that in FIG. 1.

In any of the embodiments above, the alignment of the different component of a multi-component optical assembly may be divided up into multiple alignment procedures of sub-components. For example, one or more components can be measured while one or more other components are not present to thereby simplify the analysis of the optical interference pattern for the measured components. Thereafter, the measured components can be removed, but fixtured so that they can be easily reinserted at the measured position after the other components are inserted and measured. For the alignment of a doublet, for example, the procedure may include the following steps as illustrated schematically by the flow diagram in FIG. 10. First, the first element is inserted into a fixture for the optical assembly (step 1010). Then its position is measured (step 1012) and recorded (step 1014) with appropriate staging or fixturing such that it can be returned to its just-determined position in a later step. The first element is then removed (step 1016) and the second element is inserted (step 1018). The optical interference pattern for the second element is then measured to determine its position and the second element is then repositioned based on this measurement and the measured position for the first element (step 1020). Thereafter, the first element is re-inserted at its fixture position so that the two elements are now properly aligned with one another (step 1022). This procedure may be relevant in cases where curvatures of wavefronts reflected off of multiple elements are hard to distinguish and therefore the measurement of relevant surfaces is compromised.

Figure 5:
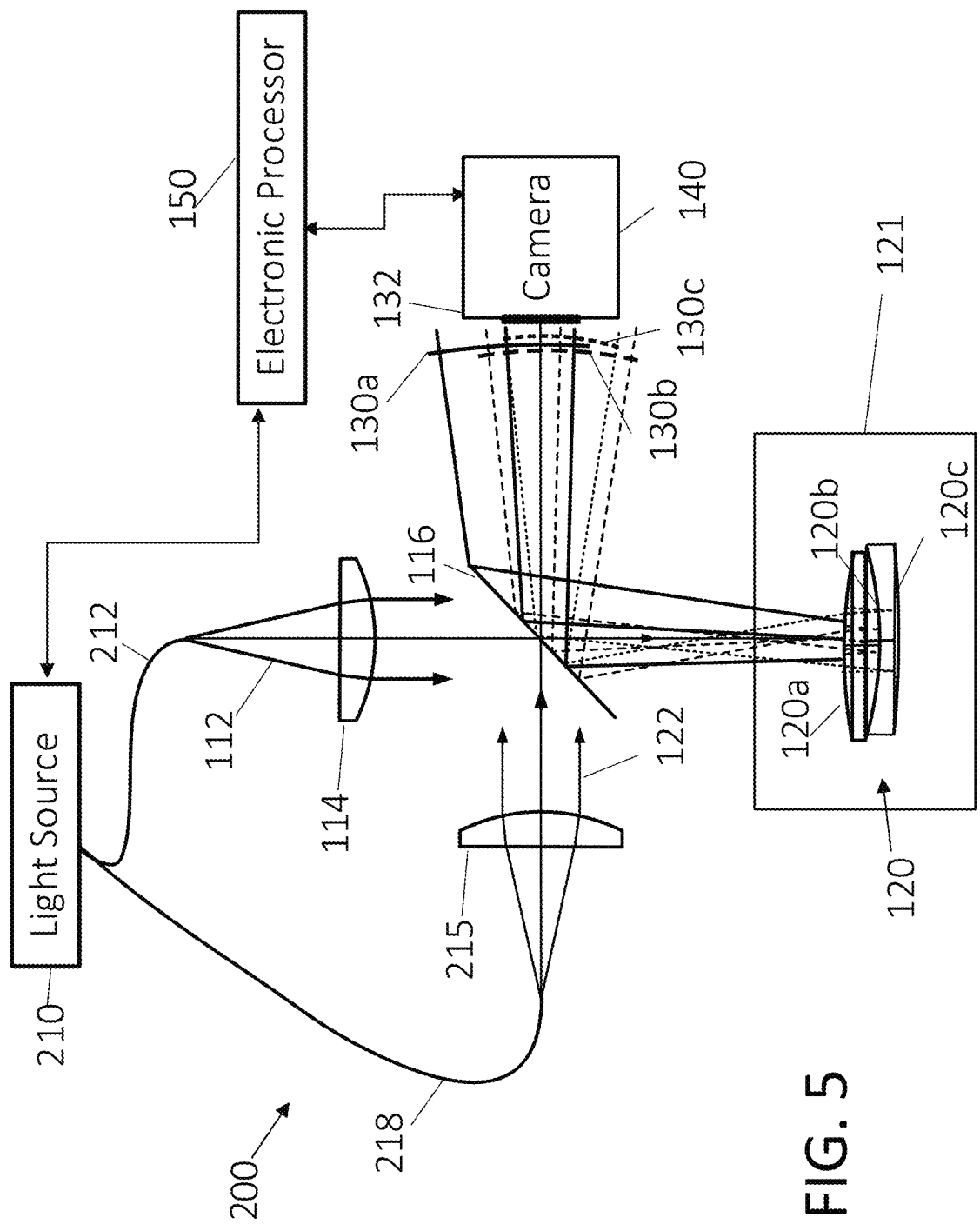
FIG. 5 is a schematic diagram of another embodiment of an interferometric optical system for measuring the alignment of different surfaces of a multi-component optical assembly under test.

Further embodiments also include using different types of optical systems for generating and recording the hologram from the multiple surfaces of the optical assembly. For example, FIG. 5 is a schematic diagram of an interferometric optical system 200 for generating the hologram of optical assembly 120 that is similar to optical system 100, except that reference mirror 118 is not used. Instead, light source 210 provides both the light for both the measurement and reference wave fronts via optical fibers 212 and 218, respectively, and a reference collimating lens 215 is used to collimate the reference light 122 emerging from optical fiber 218. In yet further embodiments, a fiber optic attenuator or fiber splitter may be incorporated to vary the relative intensities of the reference light 122 and measurement light 112.

In yet further embodiments, the interferometric optical system for generating the hologram can be adapted to measure an interference pattern of the hologram that directly corresponds to its complex field amplitude, and not its intensity (which corresponds to the absolute square of this complex field amplitude). For example, this may be done by using phase-shifting interferometry techniques that are well-known in the art and involve recording a number of camera frames with incremental phase shifts of the reference beam, for example. Other interferometric techniques require only a single camera frame. See, e.g., J. D. Tobiason and K. W. Atherton, "Interferometer using integrated imaging array and high-density phase-shifting array," U.S. Pat. No. 6,847,457 (Jan. 25, 2005). Alternatively, for example, this may be done by using a camera that is a polarized camera that includes pixel-size polarizers at various orientations in front of the camera pixels to allow for the calculation of the phase and amplitude based on a single camera image. See, e.g., J. E. Millerd, N. J. Brock, J. B. Hayes, M. B. North-Morris, M. Novak, and J. C. Wyant, "Pixelated phase-mask dynamic interferometer," in Interferometry XII: Techniques and Analysis, Proc. SPIE 5531 pp. 304-314 (2004).

In any case, in embodiments in which the optical system is adapted to directly measure, not just an intensity pattern but the complex field as in $$f(x, y) = \sum_i a_i(x, y) e^{i \varphi_i(x,y)} \quad (10)$$

the math applied by the electronic processor leading up to the test terms $t_i$ becomes much simpler in terms of all the terms that are generated. Specifically, instead of multiplying Eq. (2) with $e^{-i(\tilde{\varphi}_i - \tilde{\varphi}_i)}$, it is now Eq. (10) that is multiplied with the same $e^{-i(\tilde{\varphi}_i - \tilde{\varphi}_i)}$, resulting in N complex terms instead of $N^2+N+1$ complex terms, only one of which is the test term of interest of the form shown in Eq. (3) or Eq. (4). In practice, that means that the signal of interest competes with fewer signals that would otherwise have the potential to introduce error in the outcome of the measurement.

Figure 11A:
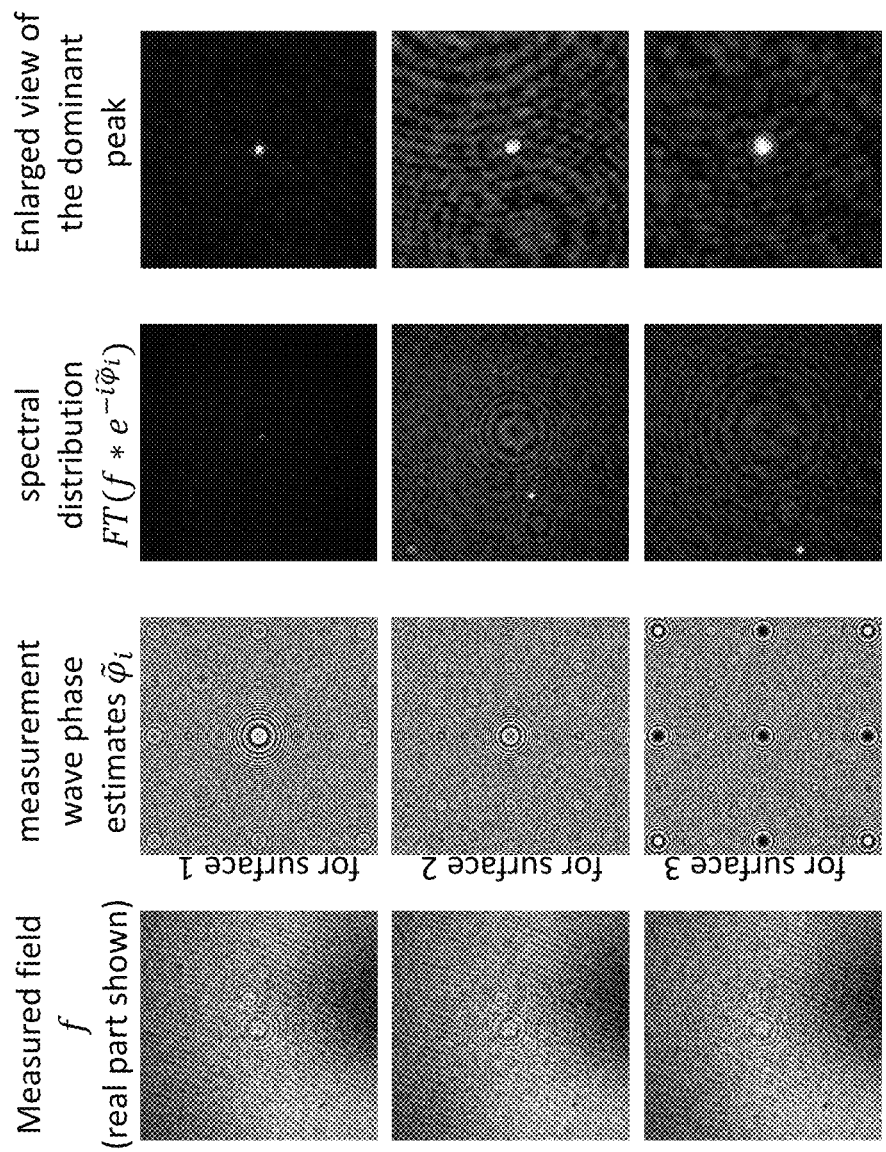
FIG. 11A and FIG. 11B are schematic illustrations of the numerical processing steps that produce the spatial frequency distributions represented by the intensity images having peaks indicative of the relative alignment of the selected surface.
Figure 11B:
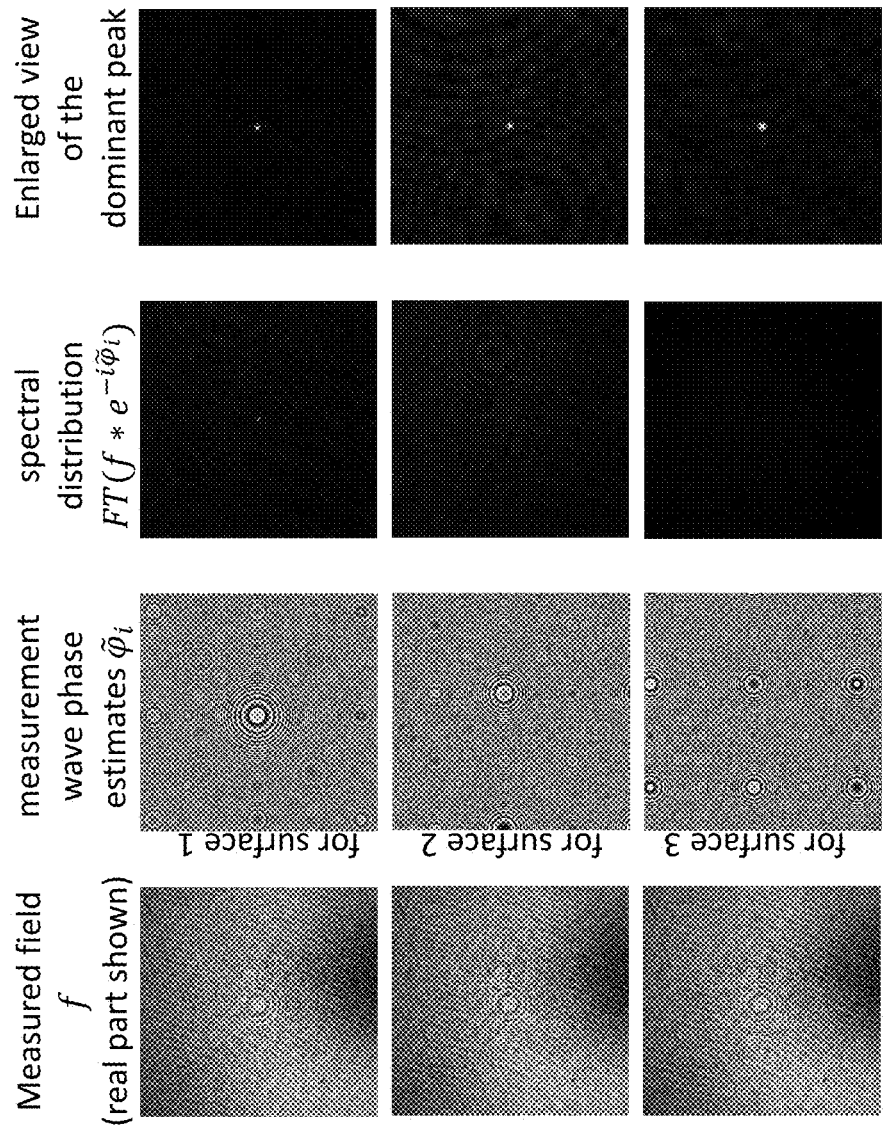

FIG. 11A and FIG. 11B depict the numerical processing steps of the above embodiment in a first and second iteration, respectively, using a real world example. Three reflecting surfaces of a doublet are present and being measured. Starting with the recorded hologram (the field distribution of which only the real part is shown, with concentric rings patterns around three locations, of which the middle one quite indistinct to the eye) in the first column, measurement wave phase estimates are shown in the second column. The spatial frequency distributions of the product of field and estimated measurement waves, represented by intensity images, are shown in the third column. Note that in FIG. 11A (first iteration), the peaks are both off-centered and blurred, while they are centered and much smaller in FIG. 11B (second iteration), to a point where they are almost not visible in the images. The fourth columns in both figures show magnified and centered versions of the peaks to emphasize the improvement of the second iteration over the first iteration. During this measurement, the doublet was tilted by ~6.7 mrad. The measured tilt between the two lens elements was 0.112 mrad.

In yet further embodiments, another way of reducing the number of mathematical terms, is to operate the interferometer without a reference wave front, either by removing the optical components that create the reference light in the interferometer or by just blocking the reference light in the interferometer. Due to the absence of the reference wave front, the observed interference intensity at the camera is:

$$I = \left( \sum_i a_i e^{i \varphi_i} \right) * \left( \sum_i a_i e^{-i \varphi_i} \right) = \sum_i a_i^2 + \sum_{i \neq j} 2 a_i a_j \cos(\varphi_i - \varphi_j). \quad (11)$$

The intensity I can now be multiplied with complex terms formed from the estimates of two wave fronts $e^{-i(\tilde{\varphi}_i - \tilde{\varphi}_j)}$, resulting in $N^2-N+1$ terms (down from $N^2+N+1$) for every combination of i and j with i≠j, including the test term $$t_{ij} = \alpha_i \alpha_j e^{i(\varphi_i - \tilde{\varphi}_i + \tilde{\varphi}_j - \varphi_j)} \quad (12)$$

Otherwise, the processing continues similarly to the embodiments above. Specifically, the electronic processor evaluates the location and the focus of peaks in the Fourier domain and knowing the sensitivities of the peaks' location and focus to alignment parameters from simulations, one can derive alignment parameters themselves. However, due to the lack of a reference, the mathematical model of the lens may be less constrained than before. A physical constraint that defines the absolute position of at least one of the lens surfaces can be helpful in this case.

In yet further embodiments, the interferometric optical system may be modified to use a lower coherence light source to enable discrimination of certain interfering wave front pairs over others. In the processing described above, the electronic processing algorithms extract information about a specific surface from a hologram that contains several interfering waves, in some cases leading to situations where the signal of interest competes with another signal currently not of interest. For example, for certain optical assemblies under test, two different surfaces can generate spherical wave fronts on the camera that have roughly the same radius of curvature and, in the case of good alignment, also the same tilt.

Figure 6:
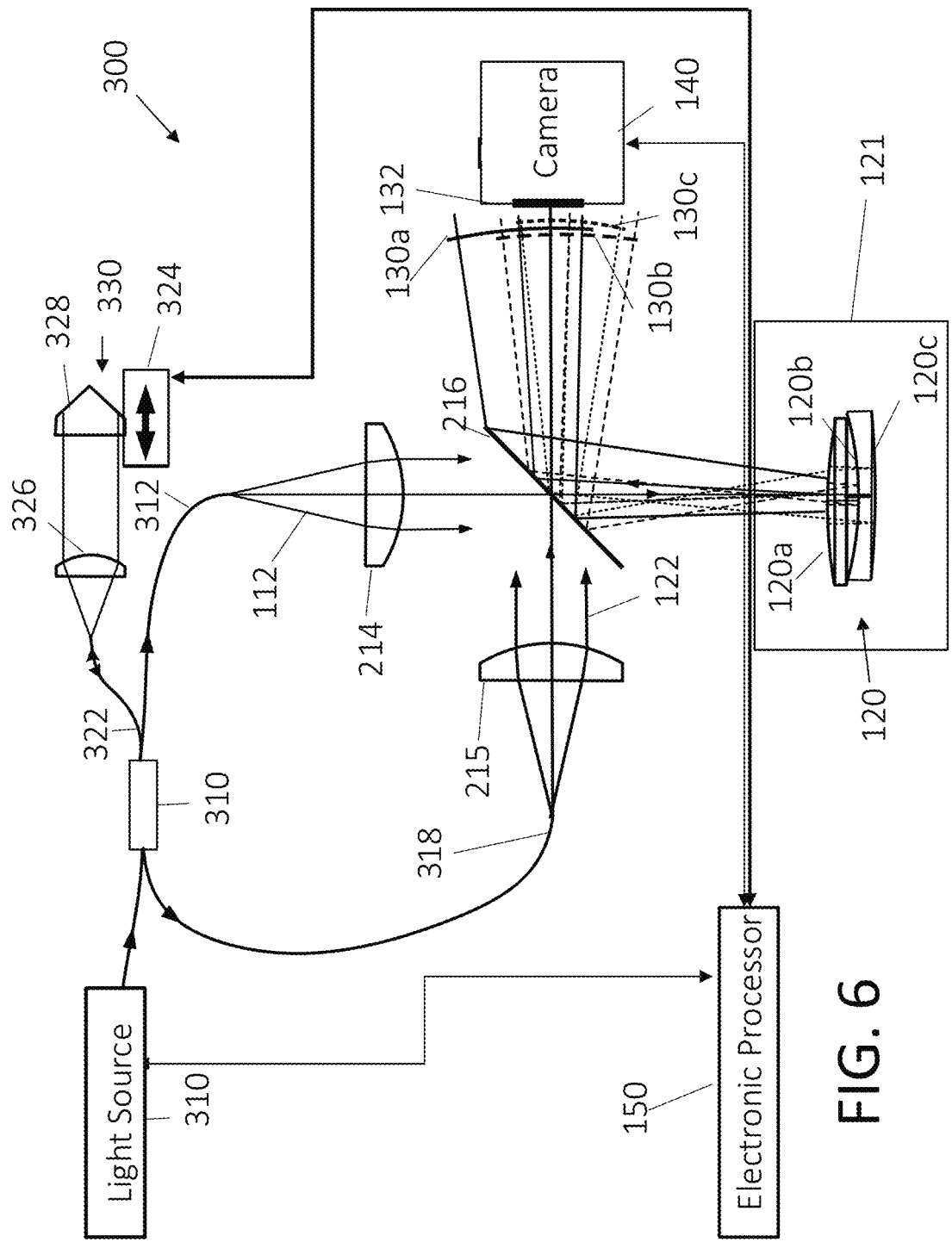
FIG. 6 is a schematic diagram of yet another embodiment of an interferometric optical system for measuring the alignment of different surfaces of a multi-component optical assembly under test.

For example, FIG. 6 is a schematic diagram of an interferometric optical system 300 for generating the hologram of optical assembly 120 that is similar to optical system 200, but uses a low coherence light source 310. Specifically, system 300 includes a 2×2 fiber optic beam splitter 322 coupled to light source 310 and reference and measurement optical fibers 318 and 312 to ultimately produce reference and measurement light 122 and 112, respectively. The fiber optic beam splitter 310 is further coupled to a variable optical delay line 330 including a collimating lens 326, retroreflector 328, and translation stage 324. The reference light travels round-trip through variable optical delay line 330 before reaching reference optical fiber 318 via fiber optic beam splitter 310. The variable optical delay line is coupled to the electronic processor 150 and operable to introduce an optical path length difference between the measurement light and reference light over a range greater than that the coherence length of light source 310, and typically greater than the round-trip optical path spacings between some or all of the surfaces of optical assembly 120.

The optical delay line allows adjustments of the reference's optical path length to the optical path length of each surface of the lens under test, such that interference fringes are generated only for one measurement wave at a time. The respective other measurement waves also illuminate the camera but, because their optical path length is substantially different from that of the reference wave, they substantially only contribute to a background intensity. The coherence length of the light source is typically chosen short enough (e.g. <1 mm) that the measurement wave from nearby surfaces will not interfere at the same time and long enough that fringes from the measurement wave of interest can fill a large fraction of camera (e.g. >0.25 mm).

Figure 7A:
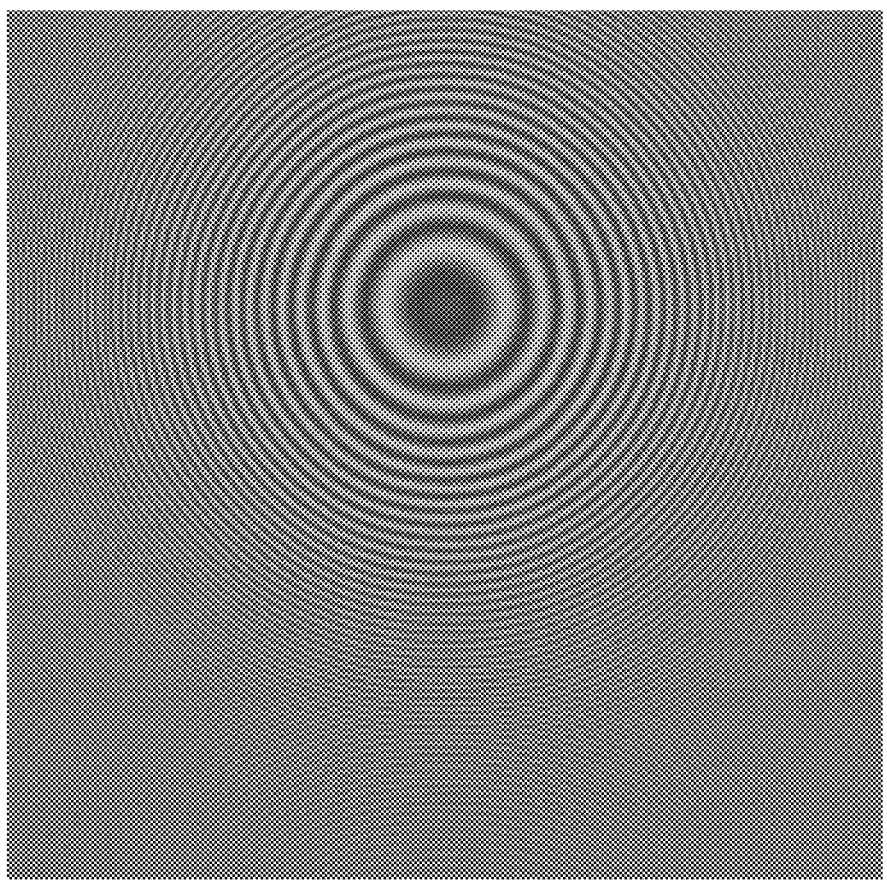
FIGS. 7A, 7B, and 7C are simulated camera images of an interference intensity pattern produced by the optical system of FIG. 6 of a multi-component optical assembly for different values of optical path length difference between the measurement and reference beams.
Figure 7B:
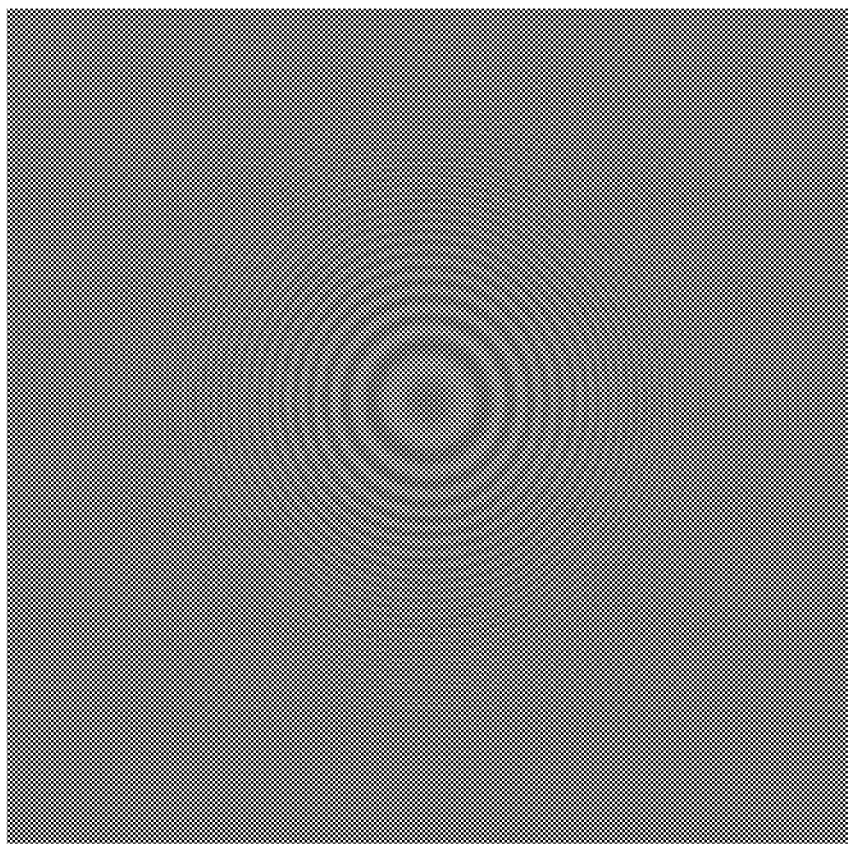
Figure 7C:
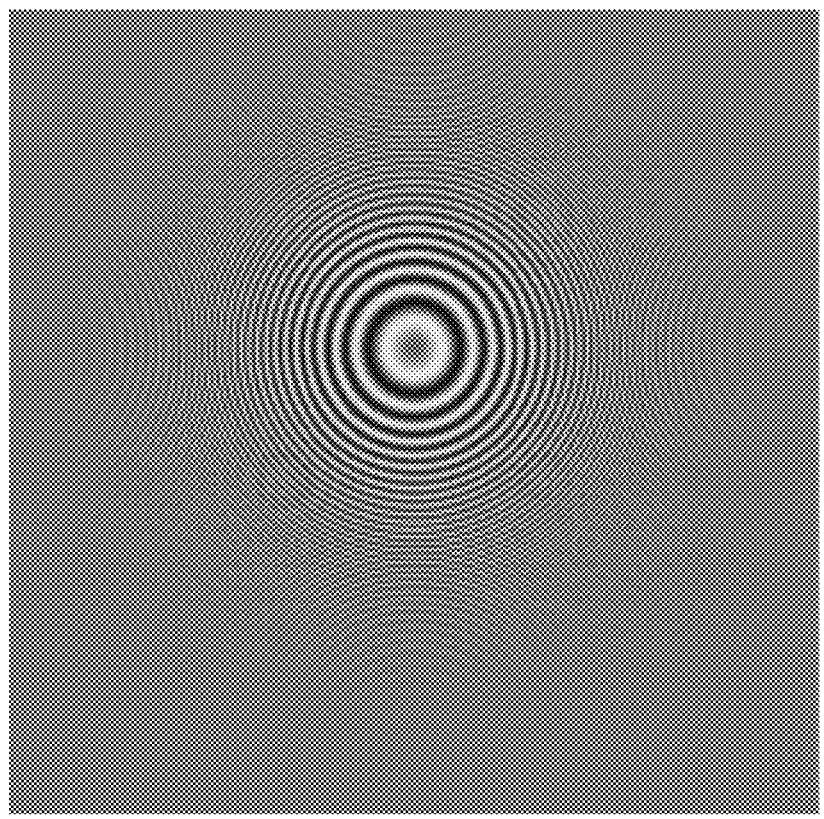

FIGS. 7A, 7B, and 7C show interference intensity patterns measured by camera 140 by system 300 for different positions of the delay line to isolate the interference fringes by each of measurement wave fronts 130a, 130b, and 130c with reference wave front 132, respectively, for the same optical assembly 120 as that generating the interference intensity pattern in FIG. 2A with optical system 100. While the original convenience of being able to record all the required information at once is lost in this configuration, it also has the additional benefit of being able to directly measure the axial spacing surfaces if the optical path length changes are carefully monitored. For example, in certain embodiments, the continuous mechanical motion of the stage 324 and retro-reflector 328 is measured with an encoder or a distance measuring interferometer, while the continuously recorded interference signal is evaluated in ways commonly used in coherence scanning interferometry (e.g. localization of modulation maxima along the optical axis). As for the light source, in certain embodiments, the shorter coherence light is achieved by use of a light source with a broader spectrum (compared to a laser), and in other embodiments can be achieved by alternative hardware settings with an extended light source that may be structured (e.g. a ring shape) or dynamic (e.g., effectively a fast moving point source). See, e.g., C. Salsbury and A. G. Olszak, "Spectrally controlled interferometry for measurements of flat and spherical optics," in SPIE Optifab, Proc. SPIE 10448 pp. 7 (SPIE, 2017) and K. Hotate and T. Saida, "Phase-modulating optical coherence domain reflectometry by synthesis of coherence function," in 10th Optical Fibre Sensors Conference, 2360 pp. 4 (SPIE, 1994).

In yet further embodiments, the embodiments above can be modified to include a light source that provides illumination at multiple different wavelengths (or multiple different sources can be used to provide the multiple different wavelengths). The use of such multiple wavelengths provides a method for collecting more information about Z positions and/or radii of curvature. For example, the use of two nearby wavelengths $\lambda_1$ and $\lambda_2$ allows for the creation of a so-called synthetic wavelength $$\Lambda = \frac{\lambda_1 \lambda_2}{|\lambda_1 - \lambda_2|},$$

which defines a distance over which a measured phase can be determined unambiguously. If for example the axial position of a surface can be determined with methods using a single wavelength as described above to a fraction of a mm that is smaller than $\Lambda/2$, the absolute phase for both $\lambda_1$ and $\lambda_2$ is derivable, and therefore, interferometric accuracy of the measured distance is achieved. In certain embodiments, the multiple wavelengths are used at the same time because the resulting fringe patterns generally are distinguishable. Various methods for the separation of the multiple wavelength signals are conceivable, including sequential use of the multiple wavelengths (multiple measurements with one wavelength at a time) or the separation of measurement or reference waves by angles.

The convenience of the proposed embodiments above lies in the ability to measure the surfaces of the lens under test with no adjustment of components as opposed to the state-of-the-art method with head lenses that are continuously adjusted along the optical axis. However, this convenience may sometimes compromise light intensity and therefore signal intensity. For example, light reflected by the surfaces of interest may diverge by wide-ranging degrees. In the example in FIG. 2A, for example, the light reaching the camera sensor comes from an area on the first, second and third surfaces that are smaller by a factor of 3.7, 6.1 and 1.8 than the camera sensor, respectively. Consequently, a lot of light gets lost and the signal from the second surface competes with a signal from the third surface that is much stronger. Signal strengths can be weakened further, and differences can be even more pronounced if surface reflectivities vary by a lot due to the use of AR coatings or index-matched cements. The proposed mathematical procedures for the extraction of the misalignment information from the recorded hologram can work with surprisingly low modulation levels, sometimes invisible to the human eye. Still, in other cases, a very weak signal from one or more surfaces may not produce a usable result. Another negative consequence of sometimes only a small area on a surface contributing to the interference on the camera is a low sensitivity to angle and position changes of that surface. A low sensitivity translates to an elevated measurement uncertainty for the lens parameters associated with affected surface. Problems may also occur when one or more wave fronts reaching the camera sensor are: highly curved such that the resulting interference fringes can be resolved only over a small fraction of the recorded images; not curved at all creating and therefore easily confused with and in competition with the typically flat reference wave; close to or fully focused such that the camera becomes saturated over a small area of the sensor; caustic, i.e., folded in a way that the field cannot be described as a function of x and y; and/or barely distinguishable, i.e. with a very similar radius of curvature.

To help mitigate such problems, in certain embodiments, the relative intensities of the reference and measurement intensities 5 can be adjusted as discussed in connection with the embodiment of FIG. 5 (e.g., to increase the intensity in the measurement channel relative to the reference channel to compensate for light loss in the measurement channel). And, where helpful, the overall light intensity can also be increased. Furthermore, in other embodiments, modifications of the wave fronts involved in the formation of the hologram can be made to produce signals that can be processed better (more balanced/stronger/better distributed over the camera sensor/better distinguishable). For example: the lens assembly under test can be simply moved to different axial position and/or tilted; the lens assembly 121 can be intentionally positioned to the measurement hardware at an angle (which has a similar effect as tilting the beam); the lens assembly can be illuminated with a divergent or convergent measurement beam (which can ultimately favor one surface signal over another signal); a divergent or convergent reference beam can be used (which can reduce the fringe density related to at least one surface on the sensor); one or more optics (e.g., a lens) may be inserted between the beam splitter and camera; and/or one or more optics (e.g., a lens) may inserted lens between the beam splitter and lens under test (the inserted lens would effectively become part of the measured lens system).

Mitigation may also include the use of multiple reference and/or measurement beams. Although this increases the number of overall waves that need to be distinguishable, this could elevate a surface's signal enough so that the net effect on measurability is positive. Multiple beams in the reference or measurement path could be provided by using multiple light emitters (e.g. optical fiber ends), beam splitters or diffractive elements. The generation of multiple beams can occur in various locations of the interferometer: in the illumination leg for reference or measurement beams; in the space between beam splitter and lens under test; in between the beam splitter and the camera. Furthermore, in certain embodiments, multiple reference or measurement beams may be used sequentially or in combination. This mitigates the downside of creating too many additional waves at the same time. For example, in certain embodiments the interferometric measurement system may include a number of switchable tool configurations that elevate at least one signal in each configuration. The goal is to create the multiple beams repeatably and with good knowledge of the resulting wave fronts. To enable this, calibrations, rigid stops (such as kinematic mounts) or highly repeatably switching components can be used. Example hardware components include: multiple optical fibers emitting light at multiple axial or radial positions; diffractive, reflective or refractive elements that can be registered against rigid stops, e.g. kinematic mounts, including sets of refractive lenses and/or sets of Fresnel lenses; and/or switchable diffractive, reflective or refractive elements. Such switchable elements include: liquid lenses, adaptive technologies enabled by electrowetting and other phenomena; deformable mirrors; spatial light modulators that are able to encode freely programmable wave fronts (within the limits of the SLM's resolution); and/or Pancharatnam-Berry lenses in combination with a liquid crystal to control the polarization in order to choose one of two wave fronts.

Figure 8:
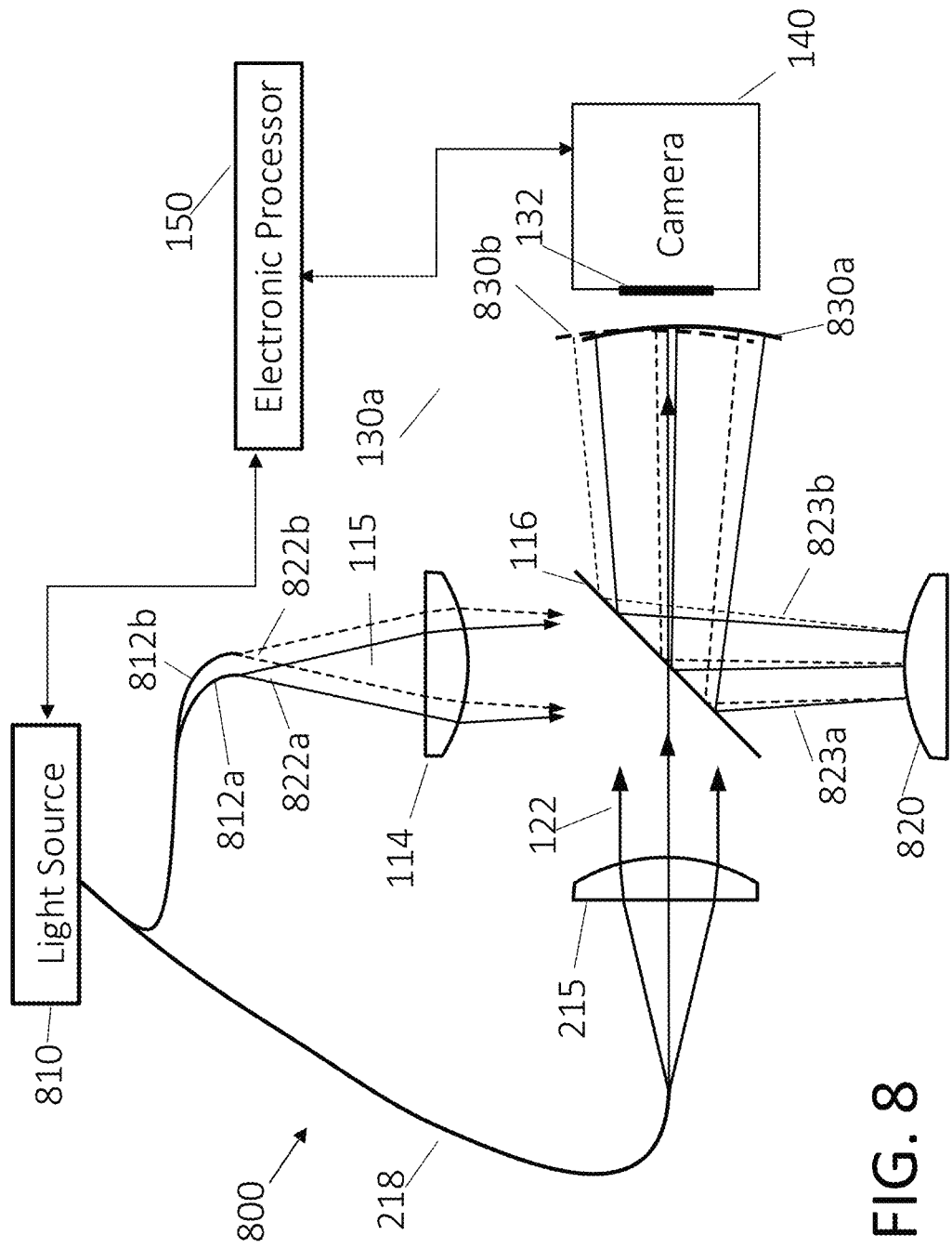
FIG. 8 is a schematic diagram of a modification to the interferometric optical system of FIG. 5 to demonstrate multi-beam illumination of a test surface for determining a radius of curvature (ROC) for the test surface.

One example of a simple modification to the interferometric optical system for generating the hologram is shown in FIG. 8. While the specific systems and algorithms described above can derive lateral alignment parameters (tilt and decenter) and axial alignment parameters, the modeling assumes that the surface radii of curvatures of the elements are known. This is because both a change in radii of curvature and axial position changes of lens elements can introduce almost indistinguishable curvature changes of measurement wave fronts. Interferometric optical system 800 is similar to system 200 in FIG. 5, except that the light source 810 is coupled to two measurement optical fibers 812a and 812b to provide to measurement beams 822a and 822b, respectively, each equally offset from the optical axis 115 of collimating lens 114. These beams thereby illuminate a single test surface 820 of the test optic at an angle $\alpha$ to one another (corresponding to the spacing there between the two optical fibers 812a and 812b and the focal length of collimating lens 114) to produce reflected measurement beams 823a and 823b and corresponding measurement wave fronts 830a and 830b at camera, which each interfere with reference wave front 132 on camera 140 to generate the interference intensity pattern. In other embodiments, other methods of generating multiple beams include beam-splitting optical components or diffraction gratings.

Figure 9A:
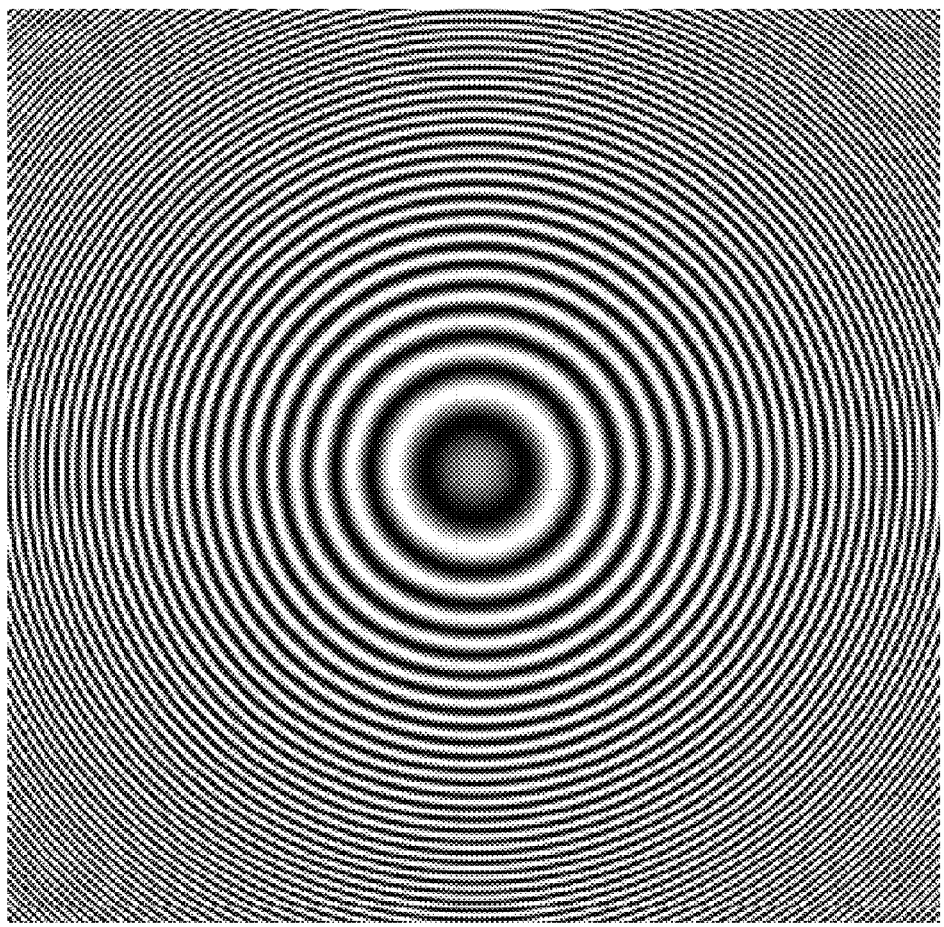
FIGS. 9A and 9B are simulated camera images of an interference intensity pattern produced by the optical systems of FIG. 5 (FIG. 9A) and FIG. 8 (FIG. 9B) of a single test surface to demonstrate multi-beam illumination of a test surface for determining a radius of curvature (ROC) for the test surface.
Figure 9B:
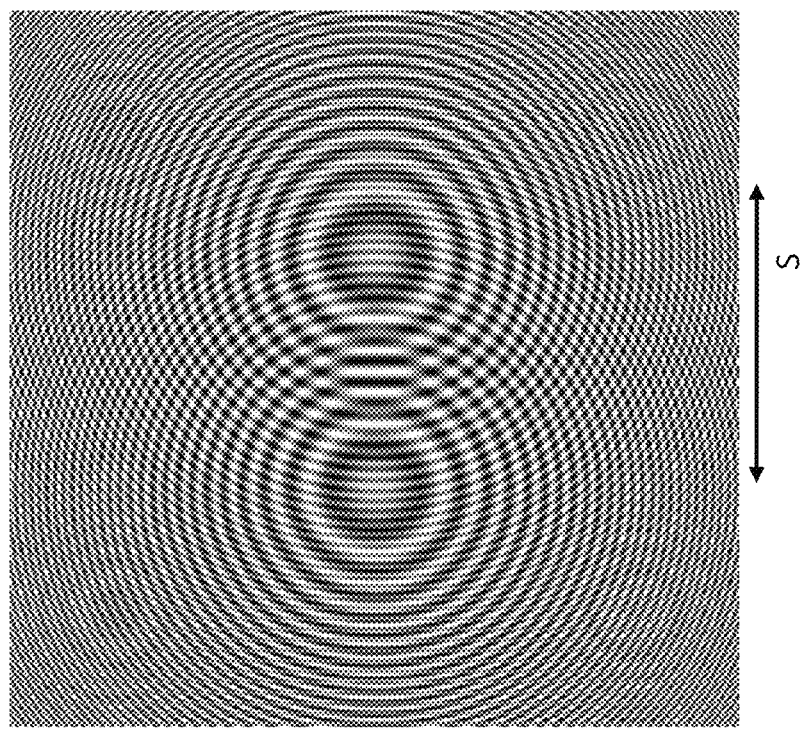

The system as shown is capable of measuring the axial position, tip/tilt AND the radius of curvature of the first surface, whereas a single beam illumination would provide either axial position OR the radius of curvature. Determining the radius of curvature of an optical component is a very common task in optics manufacturing. This method provides an instant feedback after a single measurement (e.g., even a single camera frame) as illustrated in FIGS. 9A and 9B, which shows the interference intensity pattern for the single surface 820 using only a single measurement beam (FIG. 9A) using system 200 and two measurement beams (FIG. 9B) using optical system 800. In the dual measurement beam case shown in FIG. 9B, system 800 will produce two sets of quasi circular fringes, the separation of which provides additional information compared to the single measurement beam case. Specifically, the separation s of the two circular fringe sets (as depicted in FIG. 9B) is directly related to the radius of curvature (ROC) of surface 820 through the equation:

$$ROC = \frac{s}{2\sin\frac{\alpha}{2}} \tag{13}$$

where α is the angle between the two illumination beams as noted above. Knowing the radius of curvature, the distance of the surface from the measurement apparatus is derivable from the spacings of the circular fringes. Simple image processing of the recorded interference intensity pattern by electronic processor 150 is used to extract this separation s and determine ROC using a priori knowledge of the beam angle α. This is a good example of a hologram evaluation method that does not rely on multiplication with wave fronts but rather image processing methods, although the former would be equally applicable.

On the other hand, certain embodiments may nonetheless implement an analysis involving a multiplication of with a simulated wave front similar to that in the prior embodiments. For example, in this two beam embodiment, information about the optical interference pattern may be computationally processed with at least a first simulated optical wave front derived from a model of the test surface to computationally isolate information corresponding to the test surface illuminated with only the first measurement wave front and then the optical interference pattern may be computationally processed with at least a second simulated optical wave front derived from the model of the test surface to computationally isolate information corresponding to the test surface illuminated with only the second measurement wave front.

Using multiple beams can also provide advantages in multi-surface or multi-element lenses for which the Z position and/or radii of curvature needs to be determined. Moreover, in certain embodiments, the measurement collection with the multiple beams is done sequentially (i.e., one measurement beam at a time) to simplify signal separation during data acquisition, and then the multiple measurements are processed together.

Digital Implementations

The features of the data processing described herein can be implemented in digital electronic circuitry, or in computer hardware, firmware, or in combinations of these. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits). The features can implemented in a single process or distributed among multiple processors at one or many locations. For example, the features can employ cloud technology for data transfer, storage, and/or analysis.

Scope

It must be noted that as used herein and in the appended claims, the singular forms "a", "an", and "the" include plural referents unless the context clearly dictates otherwise, e.g., when the word "single" is used.

As used herein, the terms "adapted" and "configured" mean that the element, component or other subject matter is designed and/or intended to perform a given function. Thus, the use of the terms "adapted" and "configured" should not be construed to mean that a given element, component, or other subject matter is simply "capable of" performing a given function.

As used herein, the phrases "at least one of" and "one or more of," in reference to a list of more than one entity, means any one or more of the entity in the list of entity, and is not limited to at least one of each and every entity specifically listed within the list of entity. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entity listed with "and/or" should be construed in the same manner, i.e., "one or more" of the entity so conjoined. Other entity may optionally be present other than the entity specifically identified by the "and/or" clause, whether related or unrelated to those entities specifically identified.

While this specification contains many specific implementation details, these should not be construed as limitations on the scope of any inventions or of what may be claimed, but rather as descriptions of features specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining information about an alignment of one or more optical components of a multi-component assembly, the method comprising:
   a. detecting an optical interference pattern produced from a combination of at least three optical wave fronts including at least two optical wave fronts caused by reflections from at least two surfaces of the one or more optical components; and
   b. computationally processing information derived from the detected optical interference pattern with at least one simulated optical wave front derived from a model of at least one selected optical surface of the at least two surfaces to computationally isolate information corresponding to an alignment of the selected optical surface,
   wherein the information derived from the detected optical interference pattern is a spatially-resolved intensity profile or a spatially-resolved complex amplitude profile, and where the computational processing comprises multiplying the spatially-resolved intensity profile or the spatially-resolved complex amplitude profile by the simulated optical wave front and transforming a spatially resolved product from the multiplication from spatial coordinates to spatial frequency coordinates to yield an intensity image in the spatial frequency coordinates having a dominant peak corresponding to the selected optical surface.

2. The method of claim 1, wherein the computational processing further comprises estimating a tilt and/or decenter of the selected surface from a specified alignment based on a position of at least the dominant peak in the intensity image relative to a center of the intensity image.

3. The method of claim 2, wherein the computational processing further comprises estimating an axial alignment error of the selected surface from a specified alignment based on a blurring of at least the dominant peak in the intensity image.

4. The method of claim 1, wherein the method further comprises repeating the computational processing with an iteratively improved simulated optical wave front for the selected optical surface, wherein the iteratively improved simulated optical wave front is derived from the model about the selected optical surface and the previously yielded computationally isolated information providing information about the relative alignment of the selected optical surface.

5. The method of claim 1, wherein, the method further comprises repeating the processing for at least one additional selected optical surface to thereby determine the computationally isolated information for each of multiple selected optical surfaces.

6. The method of claim 5, wherein the processing of the multiple selected optical surfaces comprises a regression analysis to contemporaneously determine information about the alignments of the multiple selected optical surfaces based on the computationally isolated information and the model for the multiple selected optical surfaces.

7. The method of claim 6, further comprising adjusting a position of each of the multiple optical components based on the computationally isolated information about the multiple selected optical surface alignments.

8. The method of claim 1, further comprising illuminating the multi-component assembly with at least two measurement beams at a non-zero angle $\alpha$ to one another to produce the optical interference pattern.

9. The method of claim 8, wherein the computational processing further comprises determining a radius of curvature for the selected optical surface based on information in a computationally isolated hologram for the selected surface and the non-zero angle $\alpha$.

10. The method of claim 1, further comprising illuminating the multi-component assembly with two measurement beams having different wavelengths to produce the optical interference pattern with corresponding reference beams also having the different wavelengths.

11. The method of claim 1, further comprising illuminating the multi-component assembly with a measurement beams having a structured spatial profile to produce the optical interference pattern.

12. The method of claim 1, further comprising illuminating the multi-component assembly with a measurement beam to produce the optical interference pattern with a reference beam, wherein an intensity of the measurement beam is increased relative to an intensity for the reference beam.

13. The method of claim 1,
   wherein a first wave front of the at least two optical wave fronts caused by the reflections from the at least two surfaces is transmitted by a first surface of the at least two surfaces and reflected by a second surface of the at least two surfaces and wherein a second wave front of the at least two optical wave fronts caused by the reflections from the at least two surfaces is reflected by the first surface of the at least two surfaces.

14. The method of claim 1, wherein the computationally isolated information corresponds to a spatial frequency distribution that can be represented as the intensity image having the dominant peak corresponding to the relative alignment of the selected optical surface.

15. The method of claim 1, further comprising using the computationally isolated information to determine whether the alignment of the one or more optical components of the multi-component assembly is within a specification tolerance.

16. The method of claim 1, further comprising adjusting a position of the optical component comprising the selected optical surface relative to another component in the multi-component optical assembly based on the computationally isolated information.

17. The method of claim 1, further comprising combining the at least two optical wave fronts caused by reflections from the at least two surfaces with a reference optical wave front derived from a common light source to produce the optical interference pattern.

18. The method of claim 17, wherein the common light source has a coherence length smaller than an optical distance between two adjacent optical surfaces in the multi-component assembly.

19. The method of claim 17, wherein the common light source has a coherence length greater than an optical distance between two adjacent optical surfaces in the multi-component assembly and smaller than an optical distance between two non-adjacent optical surfaces in the multi-component assembly.

20. The method of claim 1, wherein the model comprises information sufficient to estimate a phase profile for an optical wave front reflected from the selected optical surface.

21. The method of claim 20, further comprising combining the at least two optical wave fronts caused by reflections from the at least two surfaces with a reference optical wave front derived from a common light source to produce the optical interference pattern, and wherein the model further comprises information sufficient to estimate a phase profile for the reference optical wave front.

22. The method of claim 21, wherein the known information about the at least one selected optical surface comprises information about a radius of curvature and any aspheric coefficients for the at least one selected optical surface.

23. The method of claim 22, wherein the simulated optical wave front comprises a phase variation corresponding to a phase difference between the estimated phase profile and one other phase profile.

24. The method of claim 23, wherein the one other phase profile is a phase profile of a reference wave front.

25. An apparatus for determining information about an alignment of one or more optical components of a multi-component assembly, the apparatus comprising:
  a. an interferometric optical system for detecting an optical interference pattern produced from a combination of at least three optical wave fronts including at least two optical wave fronts caused by reflections from at least two surfaces of the one or more optical components; and
  b. one or more electronic processors coupled to the interferometric optical system and configured to computationally process information derived from the detected optical interference pattern with at least one simulated optical wave front derived from a model of at least one selected optical surface of the at least two surfaces to computationally isolate information corresponding to an alignment of the selected optical surface,
  wherein the information derived from the detected optical interference pattern is a spatially-resolved intensity profile or a spatially-resolved complex amplitude profile, and where the computational processing comprises multiplying the spatially-resolved intensity profile or the spatially-resolved complex amplitude profile by the simulated optical wave front and transforming a spatially resolved product from the multiplication from spatial coordinates to spatial frequency coordinates to yield an intensity image in the spatial frequency coordinates having a dominant peak corresponding to the selected optical surface.

26. The apparatus of claim 25, wherein a first wave front of the at least two optical wave fronts caused by the reflections from the at least two surfaces is transmitted by a first surface of the at least two surfaces and reflected by a second surface of the at least two surfaces and wherein a second wave front of the at least two optical wave fronts caused by the reflections from the at least two surfaces is reflected by the first surface of the at least two surfaces.

27. The apparatus of claim 25, wherein the computational processing further comprises estimating a tilt and/or decenter of the selected surface from a specified alignment based on a position of at least the dominant peak in the intensity image relative to a center of the intensity image.

28. The apparatus of claim 25, wherein the computational processing further comprises estimating an axial alignment error of the selected surface from a specified alignment based on a blurring of at least the dominant peak in the intensity image.

29. The apparatus of claim 25, wherein the one or more electronic processors are further configured to repeat the computational processing with an iteratively improved simulated optical wave front for the selected optical surface, wherein the iteratively improved simulated optical wave front is derived from the model about the selected optical surface and the previously yielded computationally isolated information providing information about the relative alignment of the selected optical surface.

30. The apparatus of claim 25, wherein the one or more electronic processors are further configured to repeat the computational processing for at least one additional selected optical surface to thereby determine the computationally isolated information for each of multiple selected optical surfaces.

31. The apparatus of claim 30, wherein the processing of the multiple selected optical surfaces comprises a regression analysis to contemporaneously determine information about the alignments of the multiple selected optical surfaces based on the computationally isolated information and the model for the multiple selected optical surfaces.

32. The apparatus of claim 31, further comprising a robot configured to adjust a position of each of the multiple optical components based on the computationally isolated information about the multiple selected optical surface alignments.

* * * * *